US009800393B2

(12) United States Patent
Wei et al.

(10) Patent No.: US 9,800,393 B2
(45) Date of Patent: Oct. 24, 2017

(54) APERIODIC CQI REPORTING FOR LTE-TDD EIMTA SYSTEM

(71) Applicant: QUALCOMM Incorporated, San Diego, CA (US)

(72) Inventors: Chao Wei, Beijing (CN); Peng Cheng, Beijing (CN); Wanshi Chen, San Diego, CA (US); Neng Wang, Beijing (CN); Peter Gaal, San Diego, CA (US); Hao Xu, San Diego, CA (US); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/106,739

(22) PCT Filed: Jan. 7, 2015

(86) PCT No.: PCT/CN2015/070249
§ 371 (c)(1),
(2) Date: Jun. 20, 2016

(87) PCT Pub. No.: WO2015/109942
PCT Pub. Date: Jul. 30, 2015

(65) Prior Publication Data
US 2017/0041120 A1    Feb. 9, 2017

(30) Foreign Application Priority Data
Jan. 24, 2014 (WO) ................ PCT/CN2014/000094

(51) Int. Cl.
*H04L 5/14* (2006.01)
*H04W 24/10* (2009.01)
(Continued)

(52) U.S. Cl.
CPC ............ *H04L 5/14* (2013.01); *H04B 7/0626* (2013.01); *H04B 17/345* (2015.01);
(Continued)

(58) Field of Classification Search
None
See application file for complete search history.

(56) References Cited

U.S. PATENT DOCUMENTS 9,014,024 B2    4/2015  Chen et al.
2010/0150090 A1  6/2010  Park et al.
(Continued)

FOREIGN PATENT DOCUMENTS

CN    102036376 A    4/2011
CN    102123015 A    7/2011
(Continued)

OTHER PUBLICATIONS

International Search Report and Written Opinion—PCT/CN2014/000094—ISA/EPO—dated Oct. 27, 2014.
(Continued)

*Primary Examiner* — Candal Elpenord
(74) *Attorney, Agent, or Firm* — Anthony R. Morris

(57) ABSTRACT

A method, an apparatus, and a computer program product for wireless communication are provided. The apparatus determines a location of a reference subframe based on an A-CSI report uplink subframe, an A-CSI request downlink subframe, a reference delay, and a report delay. In an aspect, the reference delay is a first delay value before the A-CSI report uplink subframe, and the report delay is a second delay value between the A-CSI request downlink subframe and the A-CSI report uplink subframe. The apparatus determines a type of the reference subframe based on the location of the reference subframe and a subframe configuration, the type of the reference subframe being a flexible subframe or
(Continued)

a fixed subframe. The apparatus measures at least one of a channel or interference based on the reference subframe and the type of the reference subframe. The apparatus sends, at the A-CSI report uplink subframe, an A-CSI report based on the at least one of the channel or the interference.

30 Claims, 18 Drawing Sheets

(51) Int. Cl.
| | |
|---|---|
| H04B 7/06 | (2006.01) |
| H04W 72/04 | (2009.01) |
| H04L 1/00 | (2006.01) |
| H04B 17/345 | (2015.01) |
| H04L 5/00 | (2006.01) |
| H04L 1/18 | (2006.01) |

(52) U.S. Cl.
CPC .......... *H04L 1/0026* (2013.01); *H04L 1/0027* (2013.01); *H04L 5/0057* (2013.01); *H04L 5/1469* (2013.01); *H04W 24/10* (2013.01); *H04W 72/0446* (2013.01); *H04L 1/1867* (2013.01)

(56) References Cited

U.S. PATENT DOCUMENTS

| | | | | |
|---|---|---|---|---|
| 2012/0076025 A1* | 3/2012 | Barbieri | ................ | H04L 5/0023 370/252 |
| 2012/0201154 A1* | 8/2012 | Chandrasekhar | ..... | H04W 24/10 370/252 |
| 2012/0314685 A1* | 12/2012 | Chen | .................... | H04L 5/0057 370/329 |
| 2013/0242824 A1* | 9/2013 | Lee | ...................... | H04L 1/1819 370/281 |
| 2013/0322376 A1* | 12/2013 | Marinier | ............... | H04W 72/06 370/329 |
| 2015/0016291 A1* | 1/2015 | Kim | ...................... | H04L 1/0026 370/252 |
| 2015/0072708 A1* | 3/2015 | Lim | ...................... | H04W 64/00 455/456.1 |

FOREIGN PATENT DOCUMENTS

| | | |
|---|---|---|
| CN | 102315871 A | 1/2012 |
| CN | 102468929 A | 5/2012 |
| CN | 102893686 A | 1/2013 |
| WO | 2012047842 | 4/2012 |
| WO | 2013089530 A1 | 6/2013 |

OTHER PUBLICATIONS

Nternational Search Report and Written Opinion—PCT/CN2015/070249—ISA/EPO—dated Apr. 1, 2015.
Broadcom Corporation: "CSI measurement and reporting in TDD eiMTA," 3GPP Draft; R1-135535 EIMTA, 3rd Generation Partnership Project (3GPP), Mobile Competence Centre; 650, Route Des Lucioles ; F-06921 Sophia-Antipolis Cedex ; France vol. RAN WG1, No. San Francisco, CA. USA; 20131111-20131115 Nov. 13, 2013 (Nov. 13, 2013), XP050735205, Retrieved from the Internet: URL:http://www.3gpp.org/ftp/Meetings_3GPP_SYNC/RAN/RAN1/Docs/ - - [retrieved on Nov. 13, 2013], 3 pages.
Intel Corporation: "Discussion on CSI Enhancements for eiMTA Support," 3GPP Draft; R1-135099 Intel—EIMTA DL CSI, 3rd Generation Partnership Project (3GPP), Mobile Competence Centre; 650, Route Des Lucioles ; F-06921 Sophia-Antipolis Cedex; France vol. RAN WG1, No. San Francisco, USA; 20131111-20131115 Nov. 13, 2013 (Nov. 13, 2013), XP050734801, Retrieved from the Internet: URL:http://www.3gpp.org/ftp/Meetings_3GPP_SYNC/RAN/RAN1/Docs/- - [retrieved on Nov. 13, 2013], 5 pages.
Supplementary European Search Report—EP15740936—Search Authority—Munich—Aug. 3, 2017.

* cited by examiner

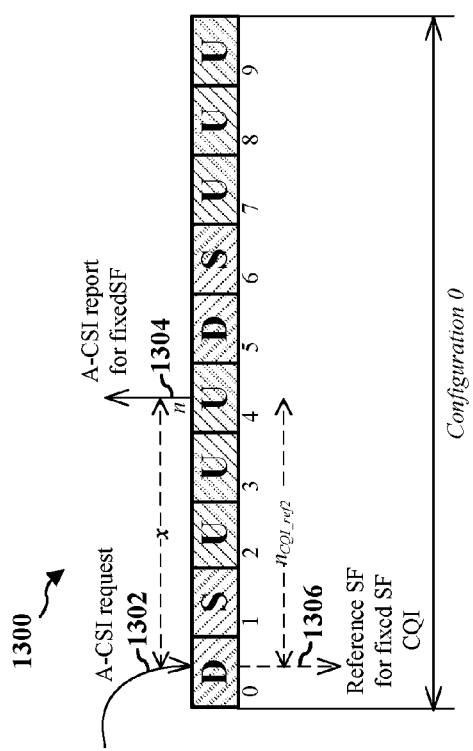

APERIODIC CQI REPORTING FOR LTE-TDD EIMTA SYSTEM

CROSS-REFERENCE TO RELATED APPLICATION(S)

This application is a national stage entry of PCT Application Serial No. PCT/CN2015/070249 entitled "APERIODIC CQI REPORTING FOR LTE-TDD EIMTA SYSTEM" and filed on Jan. 7, 2015, which claims priority to PCT Application Serial No. PCT/CN2014/000094, entitled "APERIODIC CQI REPORTING FOR LTE-TDD EIMTA SYSTEM" and filed on Jan. 24, 2014, each of which are expressly incorporated by reference herein in their entirety.

BACKGROUND

Field

The present disclosure relates generally to communication systems, and more particularly, to channel quality indicator reporting.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be for wireless communication in a time division duplex (TDD) long term evolution (LTE) based network. The apparatus determines a location of a reference subframe based on an aperiodic channel state information (A-CSI) report uplink subframe, an A-CSI request downlink subframe, a reference delay, and a report delay. In an aspect, the reference delay is a first delay value before the A-CSI report uplink subframe, and the report delay is a second delay value between the A-CSI request downlink subframe and the A-CSI report uplink subframe. The apparatus determines a type of the reference subframe based on the location of the reference subframe and a subframe configuration, the type of the reference subframe being a flexible subframe or a fixed subframe. The apparatus measures at least one of a channel or interference based on the reference subframe and the type of the reference subframe. The apparatus sends, at the A-CSI report uplink subframe, an A-CSI report based on the at least one of the channel or the interference.

In another aspect, the apparatus includes a memory and at least one processor coupled to the memory. The at least one processor is configured to determine a location of a reference subframe based on an A-CSI report uplink subframe, an A-CSI request downlink subframe, a reference delay, and a report delay, where the reference delay is a first delay value before the A-CSI report uplink subframe, and where the report delay is a second delay value between the A-CSI request downlink subframe and the A-CSI report uplink subframe, to determine a type of the reference subframe based on the location of the reference subframe and a subframe configuration, the type of the reference subframe being a flexible subframe or a fixed subframe, to measure at least one of a channel or interference based on the reference subframe and the type of the reference subframe, and to send, at the A-CSI report uplink subframe, an A-CSI report based on the at least one of the channel or the interference.

In another aspect, the apparatus includes means for determining a location of a reference subframe based on an A-CSI report uplink subframe, an A-CSI request downlink subframe, a reference delay, and a report delay. In an aspect, the reference delay is a first delay value before the A-CSI report uplink subframe, and the report delay is a second delay value between the A-CSI request downlink subframe and the A-CSI report uplink subframe. The apparatus includes means for determining a type of the reference subframe based on the location of the reference subframe and a subframe configuration, the type of the reference subframe being a flexible subframe or a fixed subframe. The apparatus includes means for measuring at least one of a channel or interference based on the reference subframe and the type of the reference subframe. The apparatus includes means for sending, at the A-CSI report uplink subframe, an A-CSI report based on the at least one of the channel or the interference.

In another aspect, a computer-readable medium storing computer executable code may be provided. The computer-readable medium includes code for determining a location of a reference subframe based on an A-CSI report uplink subframe, an A-CSI request downlink subframe, a reference delay, and a report delay, wherein the reference delay is a first delay value before the A-CSI report uplink subframe, and wherein the report delay is a second delay value between the A-CSI request downlink subframe and the A-CSI report uplink subframe. The computer-readable medium includes code for determining a type of the reference subframe based on the location of the reference subframe and a subframe configuration, the type of the reference subframe being a flexible subframe or a fixed subframe. The computer-readable medium includes code for measuring at least one of a channel or interference based on the reference subframe and the type of the reference subframe. The computer-readable medium includes code for sending, at the A-CSI report uplink subframe, an A-CSI report based on the at least one of the channel or the interference.

BRIEF DESCRIPTION OF THE DRAWINGS

FIGS. 13A-13C are example diagrams illustrating the first scenario of the third approach.

DETAILED DESCRIPTION

Figure 1:
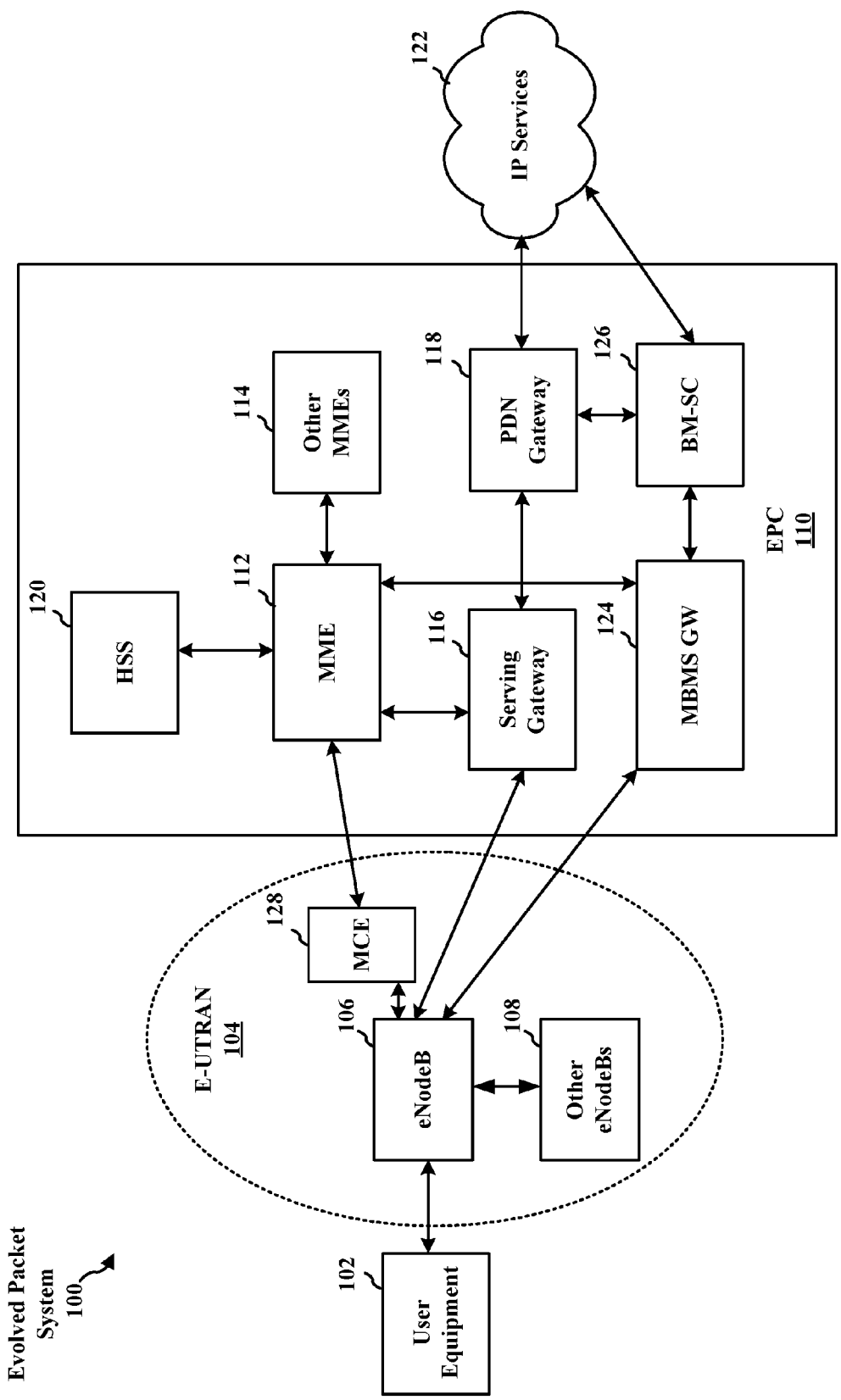
FIG. 1 is a diagram illustrating an example of a network architecture.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
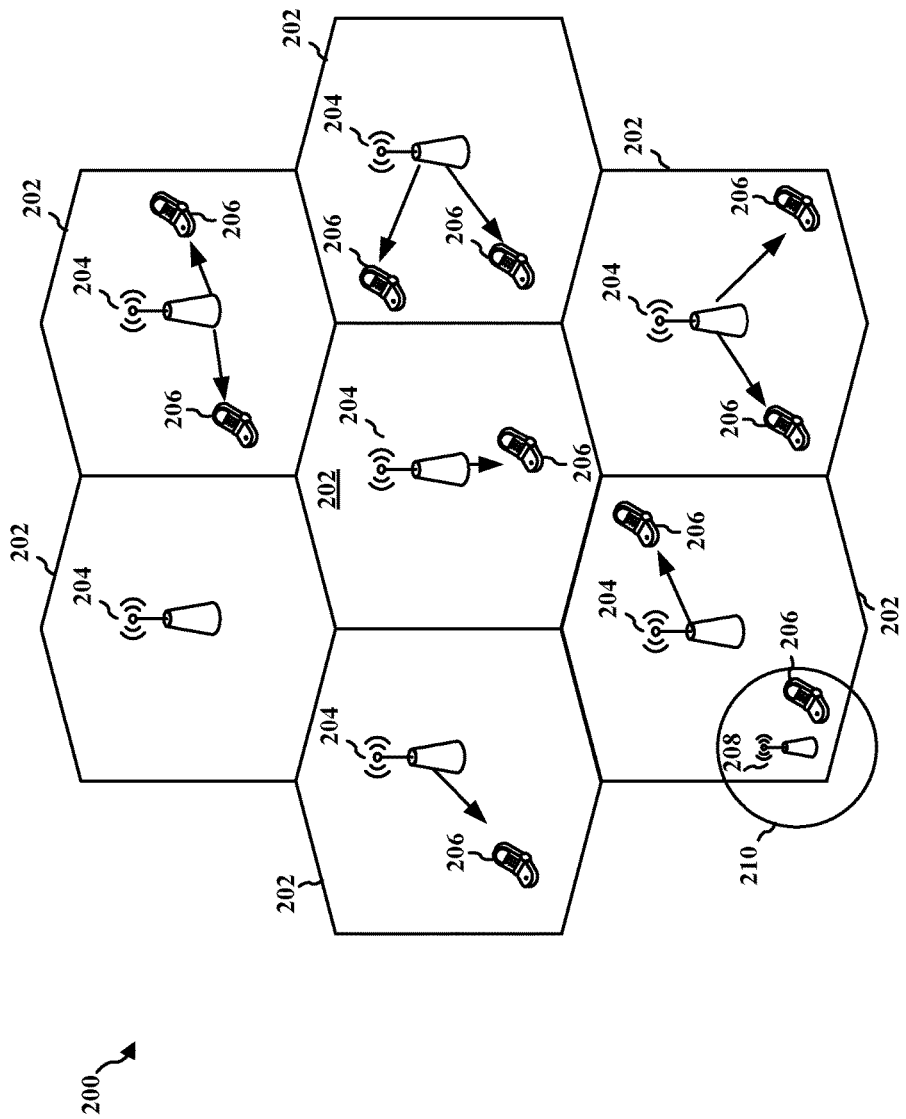
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
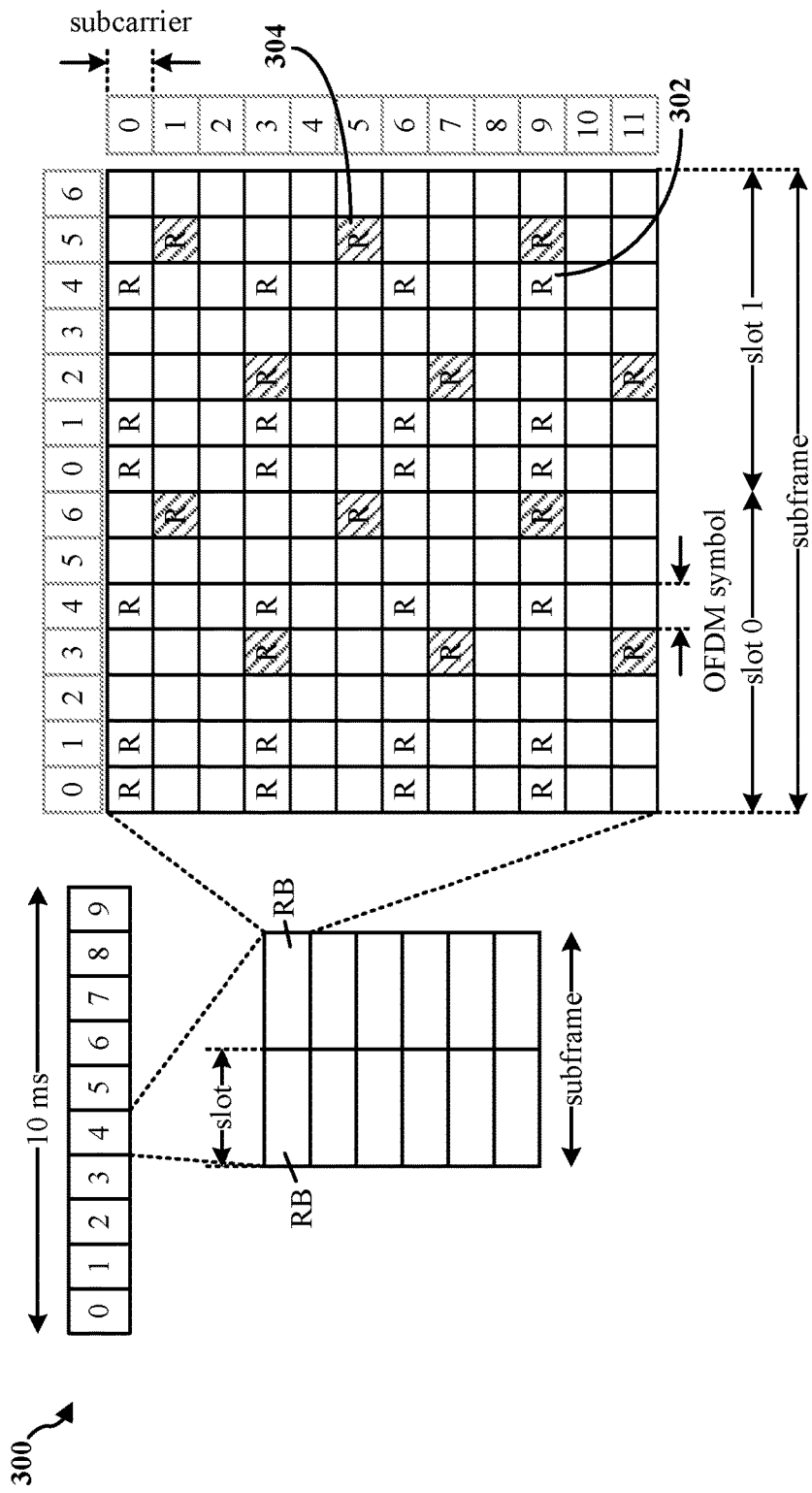
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
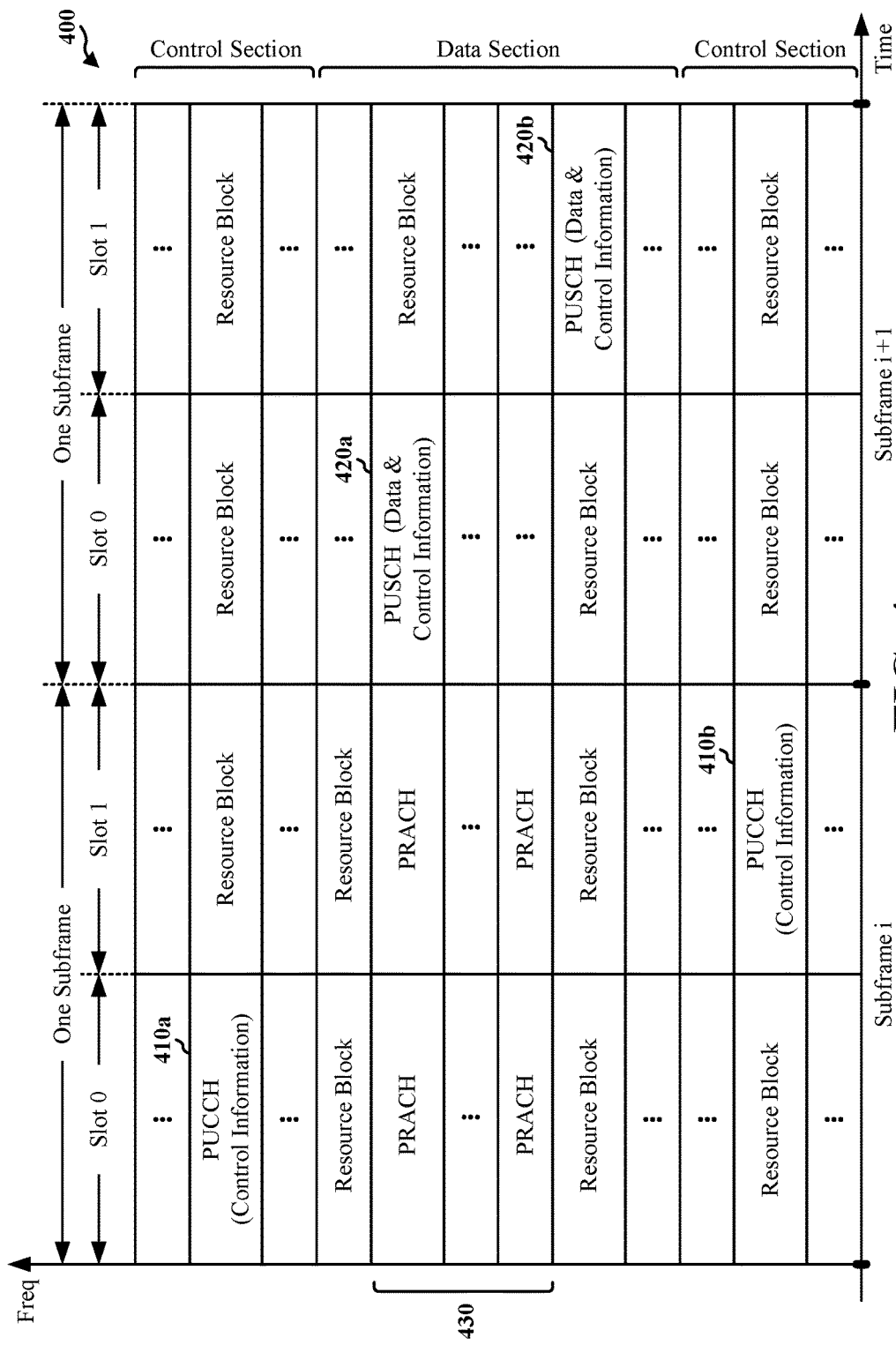
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
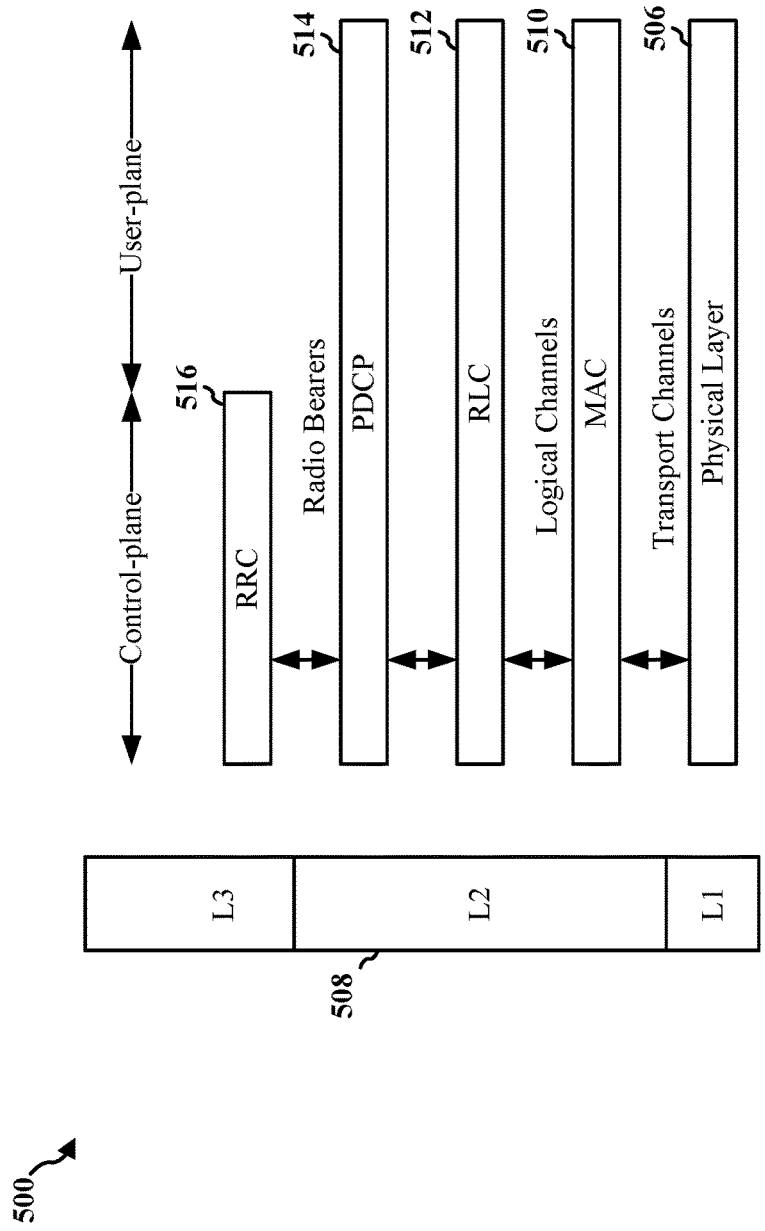
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
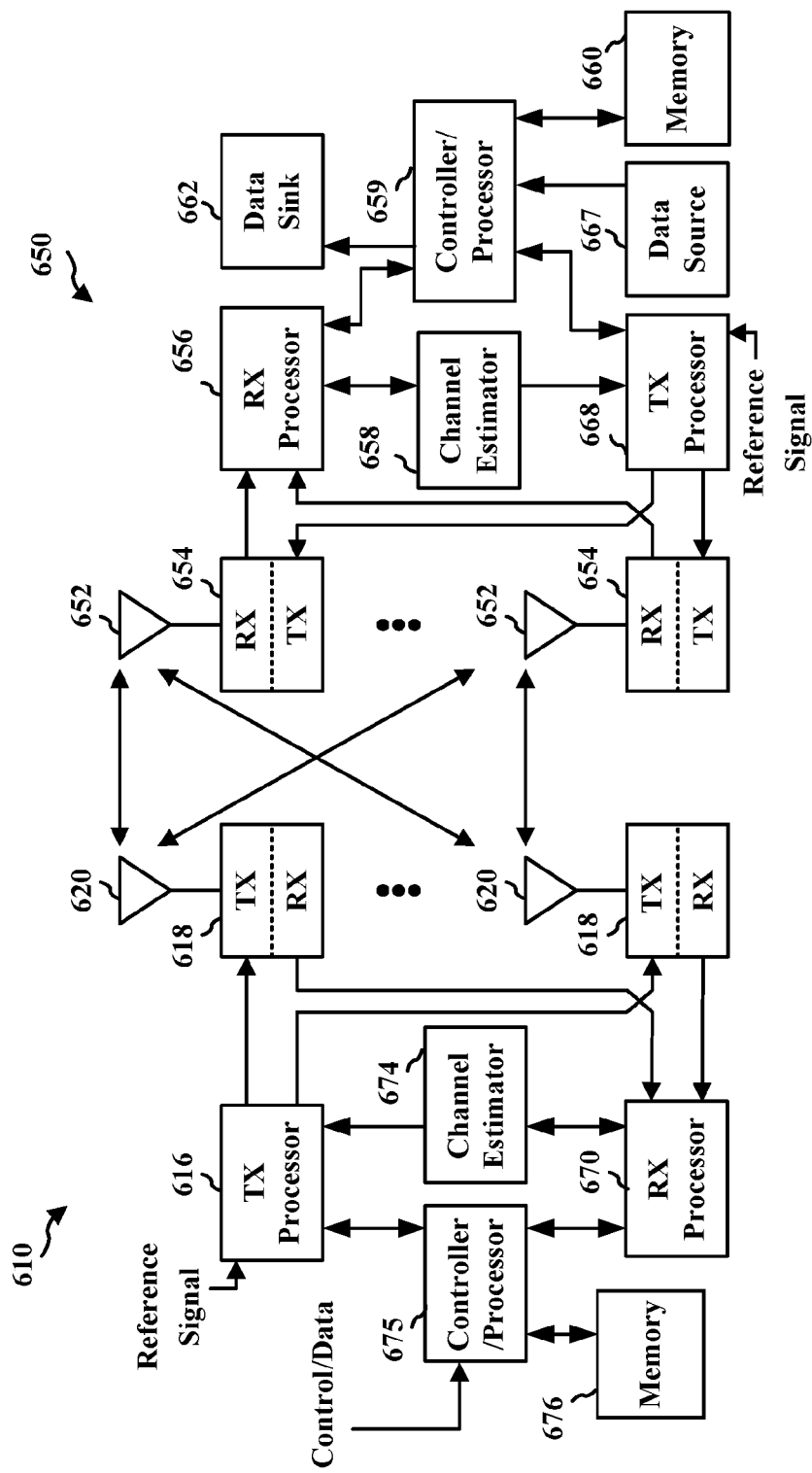
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

According to an enhanced interference management and traffic adaptation (eIMTA), TDD DL/UL subframe configurations (hereinafter, "subframe configurations") may be dynamically changed based on traffic needs. Table 1 below shows example subframe configurations.

TABLE 1

TDD UL/DL subframe configurations

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | U | D |

Thus, if the traffic needs indicate a need for a large data burst on downlink (e.g., during a short duration), a current subframe configuration may be dynamically changed to another subframe configuration that includes more DL subframes. For example, in such a case, if a current subframe configuration is subframe configuration #1 with 6 DL subframes and 4 UL subframes, the subframe configuration may be changed to subframe configuration #5 with 9 DL subframes and 1 UL subframe (thus having more DL subframes than subframe configuration #1), in order to adapt to the need for a large data burst on DL. Each cell may adopt a subframe configuration independently. Multiple cells adopting different subframe configurations may introduce interference between UEs in different cells. For example, a UE in a first cell with one subframe configuration and another UE in a second cell with a different subframe configuration may experience UE-to-UE interference. In particular, for example, the UE-to-UE interference may exist in a subframe that is configured for one type of communication in the first cell and is configured for another type of communication in the second cell. Thus, for example, the UE-to-UE interference may exist in a subframe that is used as a DL subframe in the first cell and is used as a UL subframe in the second cell. For subframes that are used for the same type of communication (e.g., UL or DL) in both the first and second cells, a base station to UE (BS-to-UE) interference may exist.

Figure 7:
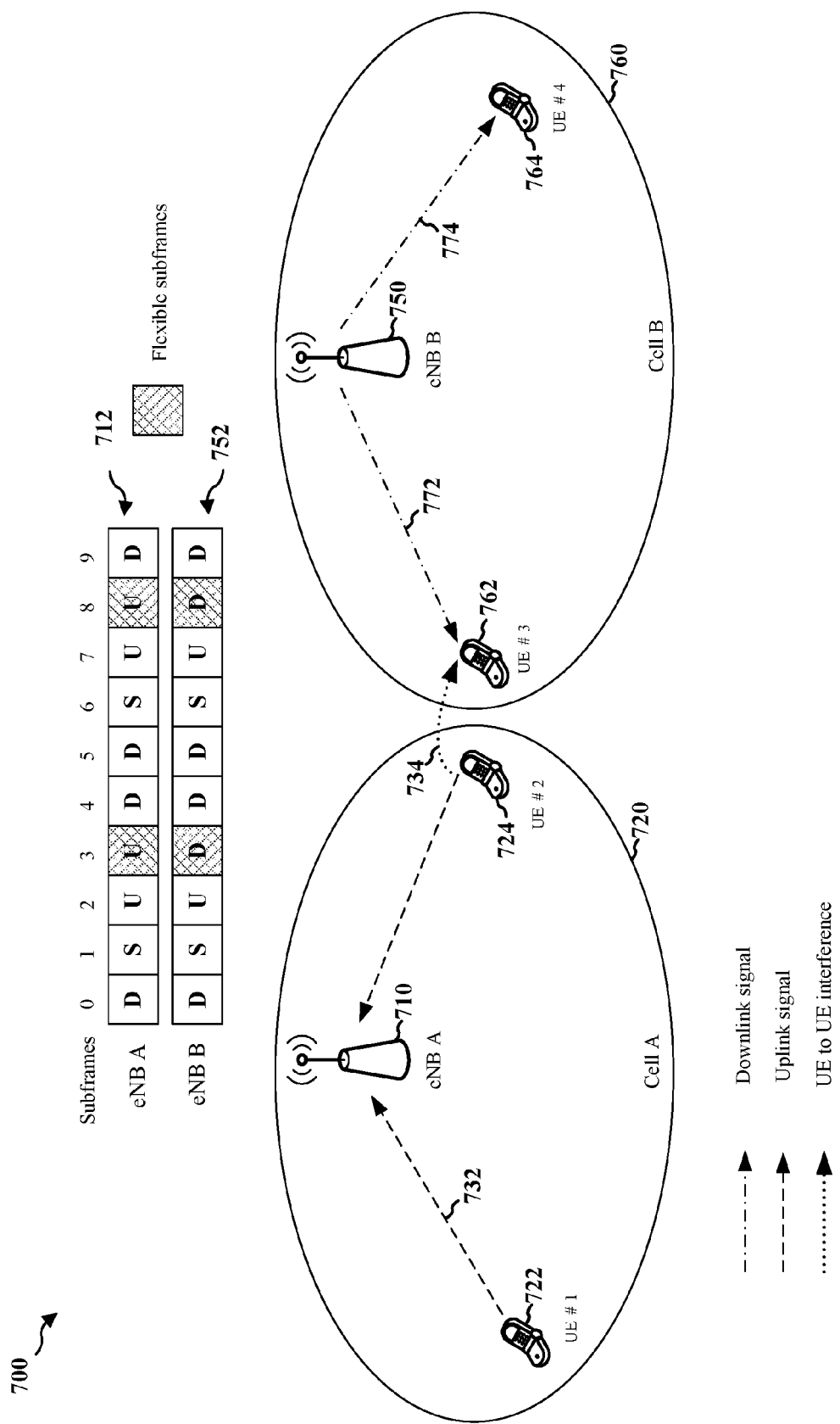
FIG. 7 is an example diagram illustrating two cells utilizing different subframe configurations.

FIG. 7 is an example diagram 700 illustrating two cells utilizing different subframe configurations. In FIG. 7, an eNB A 710 having Cell A 720 utilizes subframe configuration #1 712. An eNB B 750 having Cell B 760 utilizes subframe configuration #2 752. At subframe #3 or #8, a first UE 722 in Cell A 720 sends a UL signal 732 to eNB A 710, and a second UE 724 in Cell A 720 sends a UL signal 734. At subframe #3 or #8, a third UE 762 in Cell B 760 receives a downlink signal 772 and a fourth UE 764 in Cell B 760 receives a downlink signal 774. In the example illustrated in FIG. 7, UE-to-UE interference exists between the second UE 724 of Cell A 720 and the third UE 762 of Cell B 760. The UE-to-UE interference exists in subframe #3 and subframe #8 because subframes #3 and 8 are flexible subframes that are configured for different types of communication between the eNB A 710 and eNB B 750, where subframes #3 and 8 are UL subframes for eNB A 710 and are DL subframes for eNB B 750. For subframes other than subframes #3 and #8, the type of communication (e.g., UL or DL) is the same between subframe configuration #1 712 and subframe configuration #2 752. Thus, for subframes #0, 1, 2, 4, 5, 6, 7, and 9, BS-to-UE interference between the eNB A 710 and at least one of the first UE 722 and the second UE 724 may exist and BS-to-UE interference between eNB B 750 and at least one of the third UE 762 and the fourth UE 764 may exist.

Figure 8:
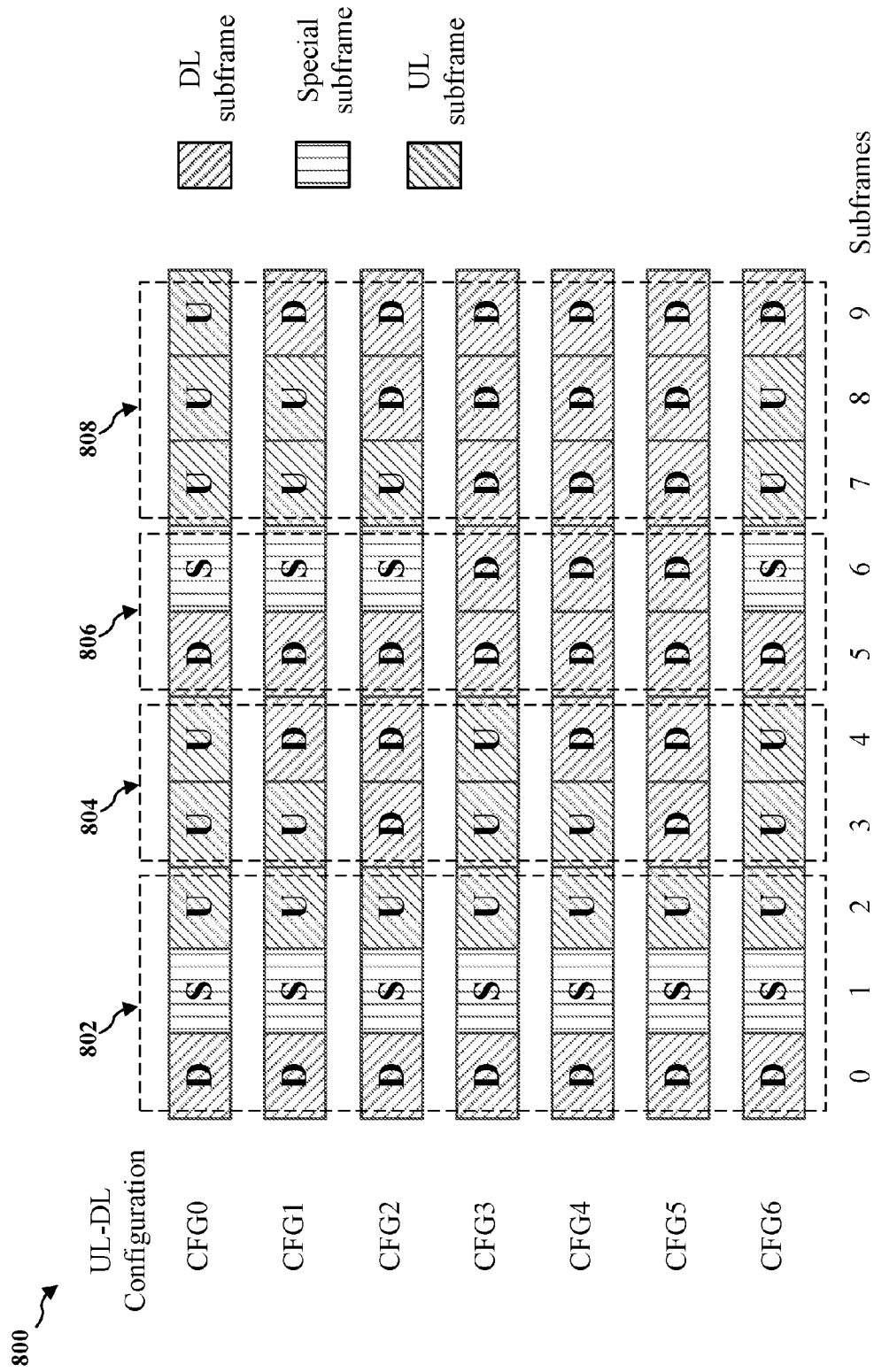
FIG. 8 is an example diagram illustrating fixed subframes and flexible subframes in the subframe configurations.

FIG. 8 is an example diagram 800 illustrating fixed subframes and flexible subframes in the subframe configurations. Subframe #s 0, 1, and 2 are fixed subframes 802. Subframe #s 3 and 4 are flexible subframes. Subframe #s 5 and 6 are fixed subframes. Subframe #s 7, 8, and 9 are flexible subframes. The fixed subframes are configured for the same type of communication throughout the configurations #0 to 6. The flexible subframes may be configured for different types of communication throughout the configurations #0 to 6. Interference in flexible subframes is different from interference in fixed subframes. For example, as discussed above, UE-to-UE interference may exist in a flexible subframe and BS-to-UE interference may exist in a fixed subframe. Thus, in the eIMTA, it is desirable to measure channel state information (CSI) in both fixed subframes and flexible subframes. It is noted that the CSI may include a channel quality indicator (CQI), a precoding matrix indicator (PMI), and a rank indicator (RI) (e.g., CQI/PMI/RI). 3GPP supports both a periodic CQI feedback and an aperiodic CQI feedback for the UEs in the eIMTA. The periodic CQI may be supported via an eNB implementation through a special configuration. The aperiodic CQI may be supported by a timeline/reference subframe design as described infra.

In the TDD, the UE may transmit aperiodic CSI including the aperiodic CQI to the eNB via UL at subframe m+k, where m denotes a subframe where a CSI request has been received at the UE. The CSI request may be received in the downlink control information (DCI) format 0/4 in PDCCH with a CSI request field set to 1. k is provided in a specification as shown in Table 2 below. Thus, for example, for subframe configuration #0, if the CSI request is received at subframe #1 (m=1), then k is 6, and thus the aperiodic CQI information is transmitted at subframe #7 (m+k=7). A reference subframe that is used for CQI estimation is generally subframe m, which is the subframe where the UE has received the CSI request (e.g., in the DCI format 0/4).

TABLE 2

| k for TDD UL-DL subframe configurations | | | | | | | | | | |
|---|---|---|---|---|---|---|---|---|---|---|
| Uplink-downlink | Subframe number | | | | | | | | | |
| Configuration | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | | 4 | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

To simplify the operations for the eIMTA, one or more DL/UL subframe configurations may be defined as reference configurations for several physical layer operations. A DL reference subframe configuration may be defined based on one of the subframe configurations and a UL reference subframe configuration may be defined based on another one of the subframe configurations, such that the DL reference subframe configuration is used for DL HARQ operations and the UL reference subframe configuration is used for UL HARQ operations. For example, with regard to a DL reference subframe configuration design, DL HARQ operations may be based on DL/UL subframe configuration #5, regardless of an actual DL/UL subframe configuration in use in a frame (or half a frame). That is, if dynamic DL/UL subframe configuration is enabled, the DL HARQ timing may be based on the subframe configuration #5 with eight DL subframes (#s 0, 1, and 3-9) and one UL subframe (#3) (e.g., a 8:1 DL/UL subframe configuration). With regard to a UL reference subframe configuration design, a UL HARQ operation can be based on DL/UL subframe configuration #0, regardless of an actual DL/UL subframe configuration in use in a frame (or half a frame). That is, if dynamic DL/UL subframe configuration is enabled, the UL HARQ timing may be based on the subframe configuration #0 with four DL subframes (#s 0, 1, 5, and 6) and six UL subframes (#s 2-4 and 7-9) (e.g., a 4:6 DL/UL subframe configuration).

Figure 9:
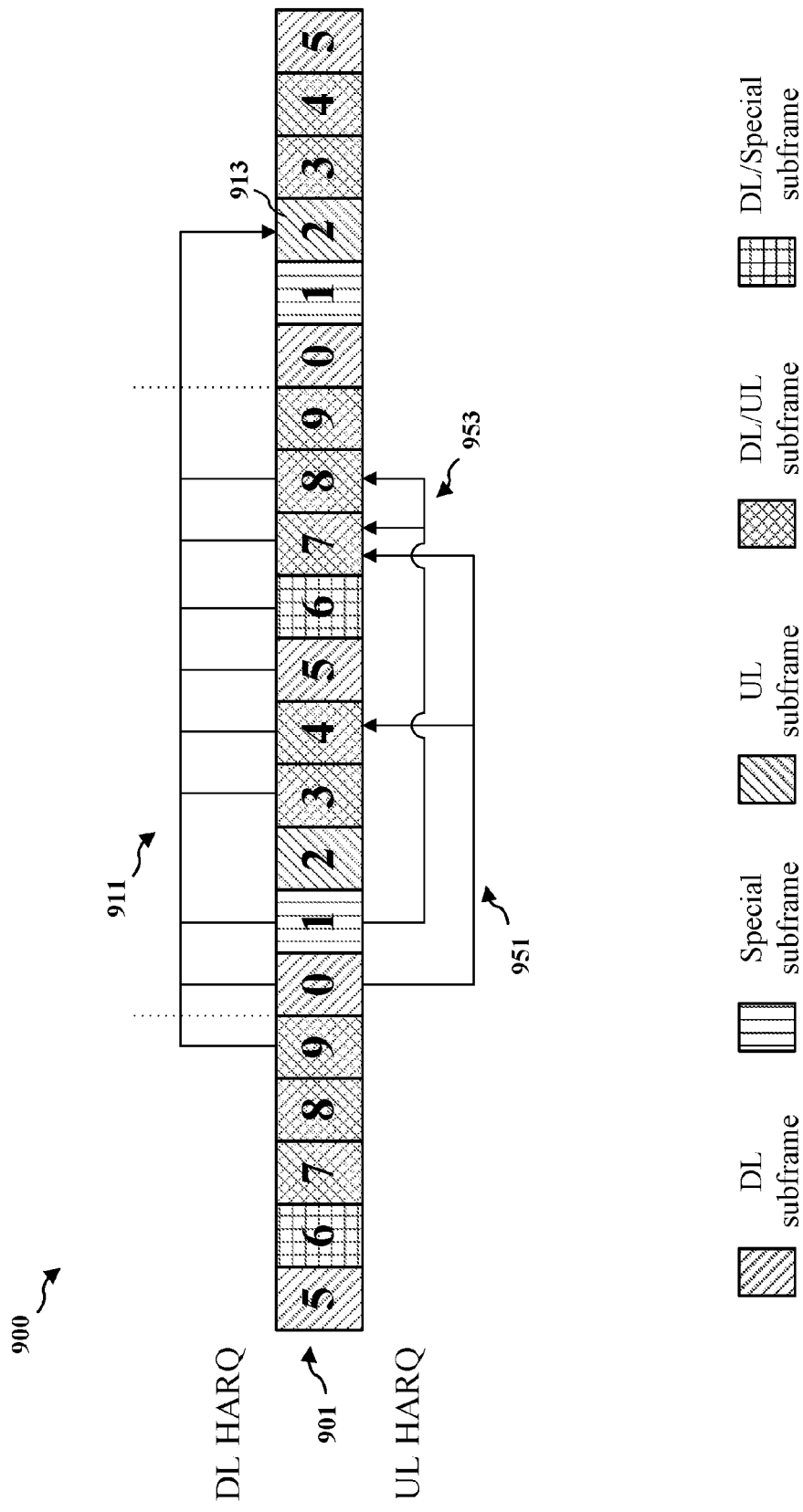
FIG. 9 is an example HARQ operation of a DL HARQ operation and a UL HARQ operation with subframes according to DL and UL reference subframe configurations.

FIG. 9 is an example HARQ operation 900 of a DL HARQ operation and a UL HARQ operation with subframes 901 according to DL and UL reference subframe configurations. In the example illustrated in FIG. 9, the DL reference subframe configuration utilizes subframe configuration #5 for the DL HARQ operation and the UL reference subframe configuration utilizes subframe configuration #0 for the UL HARQ operation. Thus, subframes #0 and 5 are fixed as DL subframes for both the DL and UL HARQ operations, subframe #1 is fixed as a special subframe for both the DL and UL HARQ operations, and subframe #2 is fixed as a UL subframe for both the DL and UL HARQ operations. Each of subframes #3, 4, 7, 8, and 9 is a DL/UL subframe that is used as a UL subframe or a DL subframe depending on whether the operation is the DL HARQ operation or the UL HARQ operation. In particular, subframes #3, 4, 7, 8, and 9 are used as DL subframes for the DL HARQ operation based on the subframe configuration #5, and subframes #3, 4, 7, 8, and 9 are used as UL subframes for the UL HARQ operation based on the subframe configuration #0. Subframe #6 is a DL/Special subframe that is used as a DL subframe or a special subframe depending on whether the operation is the DL HARQ operation or the UL HARQ operation. As illustrated in FIG. 9, during a first DL HARQ operation 911, the UE may receive DL data at subframes #9, 0, 1, 3, 4, 5, 6, 7, and 8 and may transmit an UL response at subframe #2 (913). Further, as illustrated in FIG. 9, during a first UL HARQ operation 951, the UE may receive DL control at subframes #0 and transmit associated UL information at subframes #4 and 7. During a second UL HARQ operation 953, the UE may receive DL control at subframe 1 and transmit associated UL information at subframes #7 and 8.

Figure 10:
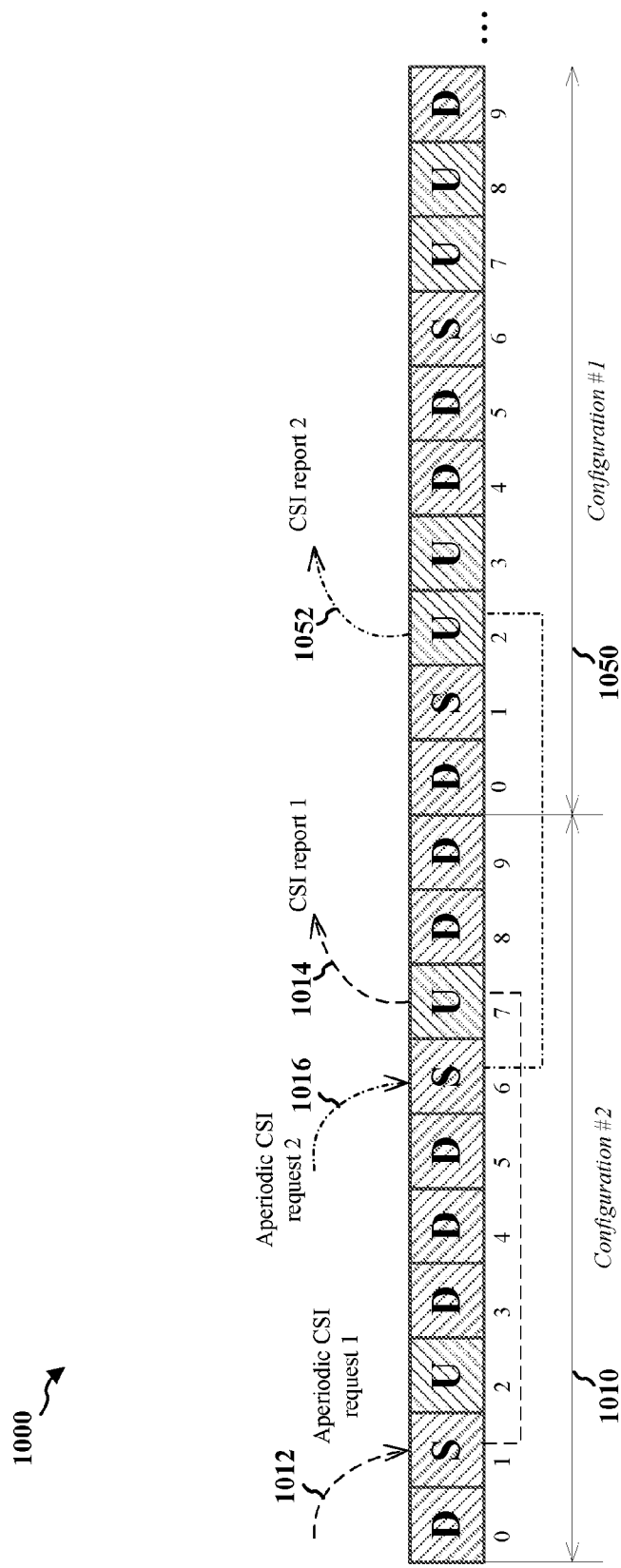
FIG. 10 is an example diagram illustrating an example of an A-CSI design.

A timeline for the aperiodic CSI (A-CSI) report may reuse the HARQ UL reference configuration to send the aperiodic CSI report. As a result, the eNB sends the CSI request in a fixed DL subframe. In an example case where subframe configuration #0 is used as the UL reference configuration, the eNB sends the CSI request in fixed DL subframes such as subframes #s 0, 1, 5 and 6. FIG. 10 is an example diagram 1000 illustrating an example of an A-CSI design. In FIG. 10, when proceeding from a first time period 1010 to a second time period 1050, the subframe configuration is changed from subframe configuration #2 of the first time period 1010 to subframe configuration #1 of the second time period 1050. When the subframe configuration #0 is used as the UL reference configuration, the CSI request may be sent in subframes #s 0, 1, 5 and/or 6, regardless of the subframe configuration of each time period. Thus, in FIG. 10, during the first time period 1010, the eNB sends a first A-CSI request at subframe #1. In response, the UE measures a first CSI at subframe #1, and subsequently sends at subframe #7 a first CSI report including the measured first CSI in the first time period 1010. The eNB sends a second A-CSI request at subframe #6. In response, the UE measures a second CSI at subframe #6 in the first time period 1010, and subsequently sends a second CSI report including the measured second CSI at subframe #2 in the second time period 1050.

In summary, the eNB generally sends the CSI request to the UE in a fixed subframe and the UE measures the CSI in the fixed subframe where the CSI request is sent. Thus, the reference subframe where the CSI is measured is generally the fixed subframe where the CSI request is sent. For example, at the reference subframe, the UE may receive the CSI request in downlink control information (DCI) format 0/4. The CSI measured in the fixed subframe is then reported to the eNB. Hence, because the UE generally measures the CSI in the fixed subframe where the CSI request is sent, the CSI in flexible subframes may not be reported while the CSI in the fixed subframe may be reported to the eNB. It is noted that the reference subframe is the subframe the UE receives a trigger indicator in DCI format 0/4. The following approaches may be utilized to determine a reference subframe at a flexible subframe and/or a fixed subframe, in order to enable measuring the CSI at a fixed subframe as well as at a flexible subframe.

When the UE receives an A-CSI request, the UE measures the channel and/or the interference, computes a CQI/PMI/RI based on the measured channel and/or the interference, and sends an A-CSI report including the CQI/PMI/RI. According to a first approach, channel measurements and interference measurements for computing the CSI value (e.g., the CQI/PMI/RI) are performed in the same reference subframe, which is a DL subframe. The reference subframe may be a fixed subframe or a flexible subframe, depending on the subframe configuration. The UE may determine a location and a type (e.g., fixed subframe or flexible subframe) of the reference subframe based on a report delay between an A-CSI request DL subframe and an A-CSI report UL subframe and/or based on the A-CSI report UL subframe. Three cases may exist in determining the reference subframe. Assume that n is the A-CSI report UL subframe, x is the report delay, and n−x is the A-CSI request DL subframe. The reference subframe may be expressed as n−$n_{CQI\_ref}$ where $n_{CQI\_ref}$ is a reference delay between the reference subframe and the A-CSI report UL subframe. The location and the type of the reference subframe n−$n_{CQI\_ref}$ may be determined according to the following three cases, based on at least one of the A-CSI report UL subframe n, the A-CSI request DL subframe n−x, the reference delay $n_{CQI\_ref}$, and the report delay x.

In a first case, if the report delay x=4 subframes, then $n_{CQI\_ref}$=4 subframes. In the first case, the reference subframe n−$n_{CQI\_ref}$ is the same as the A-CSI request DL subframe, and thus the reference subframe is a fixed DL subframe. In the first case, the UE measures the channel and the interference based on the fixed subframe at the reference subframe, and sends the A-CSI report for the fixed DL subframe based on the channel and the interference measurements. In a second case, if the report delay is greater than 4 subframes and a subframe corresponding to n−4 is a valid DL subframe for measurement, then $n_{CQI\_ref}$=4 subframes. In the second case, the reference subframe n−$n_{CQI\_ref}$ is a flexible DL subframe. Thus, the UE measures the channel and the interference based on the flexible subframe at the reference subframe, and sends the A-CSI report for the flexible DL subframe based on the channel and the interference measurements. In a third case, if the report delay is greater than 4 subframes and a subframe corresponding to n−4 is a UL subframe or an MBSFN subframe, then $n_{CQI\_ref}$=report delay x. In the third case, the reference subframe n−$n_{CQI\_ref}$ is a fixed DL subframe. Thus, the UE measures the channel and the interference based on the fixed subframe at the reference subframe, and sends the A-CSI report for the fixed DL subframe based on the channel and the interference measurements.

Figure 11A:
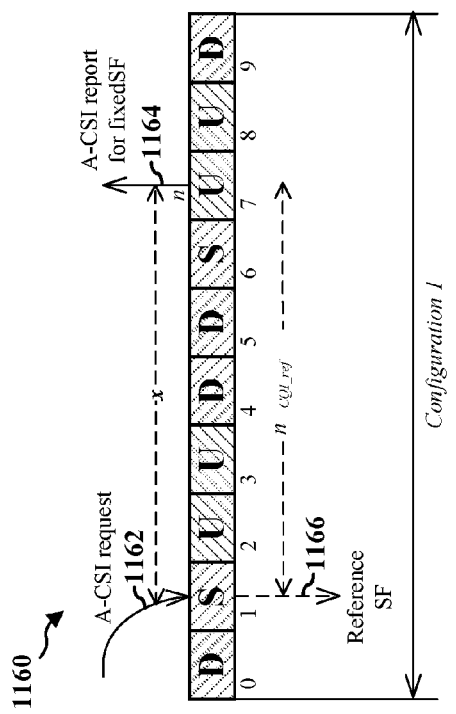
FIGS. 11A-11C are example diagrams illustrating the first approach.
Figure 11B:
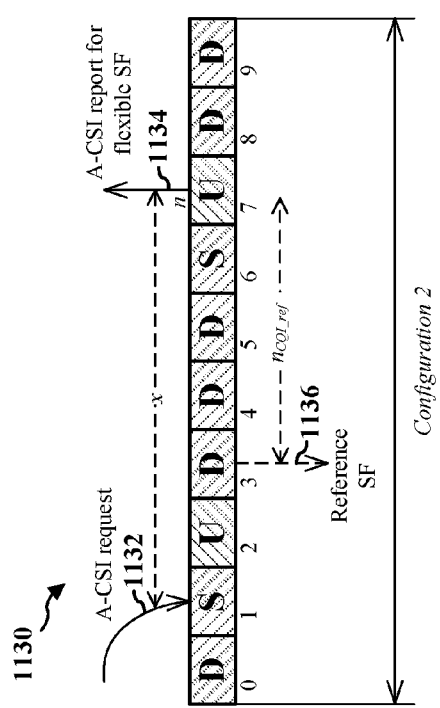
Figure 11C:
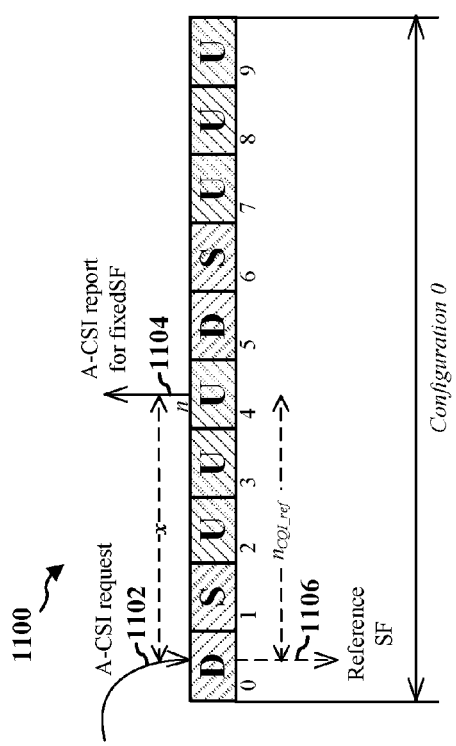

FIGS. 11A-11C are example diagrams illustrating the first approach. FIG. 11A is an example diagram 1100 illustrating an example of the first case of the first approach. The example diagram 1100 is based on subframe configuration #0. An A-CSI request 1102 is received at subframe #0, and an A-CSI report UL subframe n to send an A-CSI report 1104 is subframe #4. In FIG. 11A, because a report delay x between the A-CSI request 1102 and the A-CSI report 1104 is 4 subframes, the reference delay $n_{CQI\_ref}$ is also 4 subframes. Thus, the location of the reference subframe n−$n_{CQI\_ref}$ is the same as a location of the A-CSI request DL subframe. In the example of FIG. 11A, the A-CSI request DL subframe is subframe #0 and is a fixed subframe. Therefore, in FIG. 11A, the UE measures at 1106 the channel and the interference at subframe #0 based on the fixed subframe. Subsequently, the UE computes a CQI/PMI/RI based on the measured channel and interference, and sends at subframe #4 the A-CSI report 1104 including the CQI/PMI/RI for the fixed DL subframe.

FIG. 11B is an example diagram 1130 illustrating an example of the second case of the first approach. The example diagram 1130 is based on subframe configuration #2 An A-CSI request 1132 is received at subframe #1, and an A-CSI report UL subframe n to send an A-CSI report 1134 is subframe #7. In FIG. 11B, a report delay x between the A-CSI request 1132 and the A-CSI report 1134 is greater than 4 subframes and a subframe corresponding to n−4 is a DL subframe, which is subframe #3. As a result, the reference delay $n_{CQI\_ref}$ is also 4 subframes. Thus, the reference subframe n−$n_{CQI\_ref}$ is located at subframe #3, which is a flexible DL subframe. After the UE receives an A-CSI request 1132, the UE measures at 1136 the channel and the interference at subframe #3 based on the flexible subframe. Subsequently, the UE computes a CQI/PMI/RI based on the measured channel and interference, and sends at subframe #7 the A-CSI report 1134 including the CQI/PMI/RI for the flexible DL subframe.

FIG. 11C is an example diagram 1160 illustrating an example of the third case of the first approach. The example diagram 1160 is based on subframe configuration #1 An A-CSI request 1162 is received at subframe #1, and an A-CSI report UL subframe n to send an A-CSI report 1164 is subframe #7. In FIG. 11C, a report delay x between the A-CSI request 1162 and the A-CSI report 1164 is greater than 4 subframes and a subframe corresponding to n−4 is a UL subframe, which is subframe #3. As a result, the reference delay $n_{CQI\_ref}$ is equal to the report delay x. Thus, the reference subframe $n-n_{CQI\_ref}$ is located at subframe #1, which is a fixed subframe and the A-CSI request DL subframe. After the UE receives an A-CSI request 1162, the UE measures at 1166 the channel and the interference at subframe #1 based on the fixed DL subframe. Subsequently, the UE computes a CQI/PMI/RI based on the measured channel and interference, and sends at subframe #7 the A-CSI report 1134 including the CQI/PMI/RI for the fixed DL subframe.

According to a second approach, channel quality measurements and the interference measurements may be performed in different DL subframes or in the same DL subframe. In particular, channel quality measurements are performed at a subframe (e.g., an A-CSI request DL subframe) where an A-CSI request is received. The interference measurements are performed at a reference subframe that may be a fixed DL subframe or a flexible DL subframe, depending on the subframe configuration. For the interference measurements, the UE may determine a location and a type (e.g., fixed subframe or flexible subframe) of the reference subframe based on a report delay between an A-CSI request DL subframe and an A-CSI report UL subframe and/or based on the A-CSI report UL subframe. Three cases may exist in determining the reference subframe for the interference measurements. Assume that n is the A-CSI report UL subframe, x is the report delay, and n−x is the A-CSI request DL subframe. The location and the type of the reference subframe $n-n_{CQI\_ref}$ may be determined according to the following three cases, where $n_{CQI\_ref}$ is a reference delay between the reference subframe and the A-CSI report UL subframe.

In a first case, if the report delay x=4 subframes, then $n_{CQI\_ref}$=4 subframes. In the first case, the reference subframe $n-n_{CQI\_ref}$ for interference measurements is the same as the A-CSI request DL subframe, and thus both the channel and the interference are measured at the A-CSI request DL subframe, which is a fixed subframe. Thus, the UE measures the channel and the interference based on the fixed DL subframe at the reference subframe, and sends the A-CSI report for the fixed DL subframe based on the channel and/or the interference measurements. In a second case, if the report delay is greater than 4 subframes and a subframe corresponding to n−4 is a DL subframe, then $n_{CQI\_ref}$=4 subframes. In the second case, the reference subframe $n-n_{CQI\_ref}$ for interference measurements is a flexible DL subframe, and thus the UE sends the A-CSI report for the flexible DL subframe. Thus, in the second case, the channel is measured at the A-CSI request DL subframe while the interference is measured at a reference subframe that is different from the A-CSI request DL subframe. Subsequently, in the second case, the UE sends the A-CSI report based on the channel measurement at one subframe (e.g., the A-CSI request DL subframe) and the interference measurement at another subframe (e.g., the reference subframe $n-n_{CQI\_ref}$). In a third case, if the report delay is greater than 4 subframes and a subframe corresponding to n−4 is a UL subframe or an MBSFN subframe, then $n_{CQI\_ref}$=report delay x. In the third case, the reference subframe $n-n_{CQI\_ref}$ for interference measurements may be the same as the A-CSI request DL subframe, and thus both the channel and the interference are measured at the A-CSI request DL subframe. In the third case, the reference subframe $n-n_{CQI\_ref}$ for interference measurements is a fixed subframe. Thus, the UE measures the channel and the interference based on the fixed DL subframe at the reference subframe, and sends the A-CSI report for the fixed DL subframe based on the channel and the interference measurements.

Figure 12A:
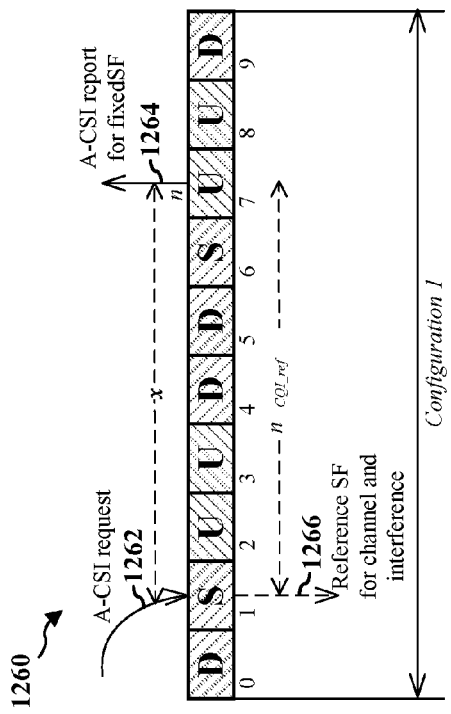
FIGS. 12A-12C are example diagrams illustrating the second approach.
Figure 12B:
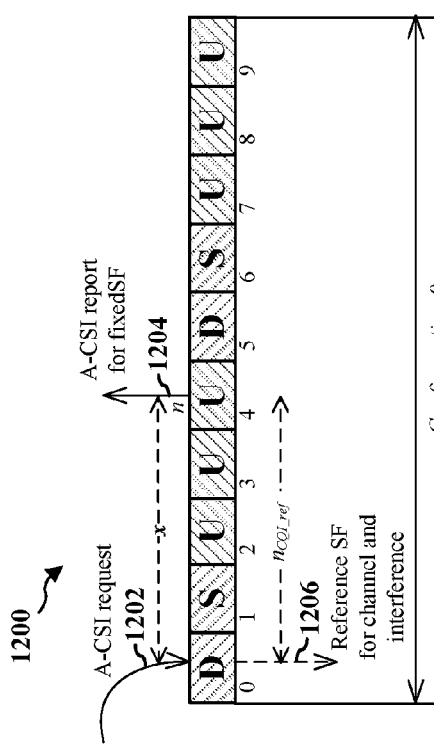
Figure 12C:
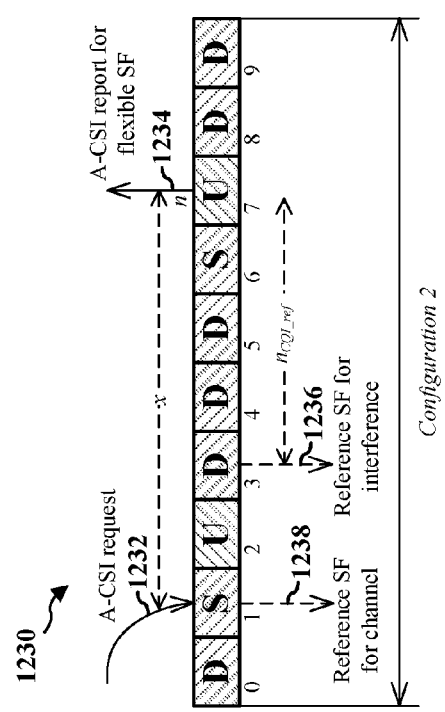

FIGS. 12A-12C are example diagrams illustrating the second approach. FIG. 12A is an example diagram 1200 illustrating an example of the first case of the second approach. The example diagram 1200 is based on subframe configuration #0, and an A-CSI report UL subframe n to send an A-CSI report 1204 is subframe #4. In FIG. 12A, the channel measurements are performed at subframe #0, which is an A-CSI request DL subframe where an A-CSI request 1202 is received. In FIG. 12A, because a report delay x between the A-CSI request 1202 and the A-CSI report 1204 is 4 subframes, the reference delay $n_{CQI\_ref}$ is also 4 subframes. Thus, the location of the reference subframe $n-n_{CQI\_ref}$ for interference measurements is the same as a location of the A-CSI request DL subframe. In the example of FIG. 12A, the A-CSI request DL subframe is subframe #0 and is a fixed subframe. Therefore, in FIG. 12A, the UE measures at 1206 the channel and the interference at subframe #0 based on the fixed subframe. Subsequently, the UE computes a CQI/PMI/RI based on the measured channel and interference, and sends at subframe #4 the A-CSI report 1204 including the CQI/PMI/RI for the fixed DL subframe.

FIG. 12B is an example diagram 1230 illustrating an example of the second case of the second approach. The example diagram 1230 is based on subframe configuration #2, and an A-CSI report UL subframe n to send an A-CSI report 1234 is subframe #7. In FIG. 12B, the channel measurements are performed at subframe #1, which is an A-CSI request DL subframe where an A-CSI request 1232 is received. In FIG. 12B, a report delay x between the A-CSI request 1232 and the A-CSI report 1234 is greater than 4 subframes and a subframe corresponding to n−4 is a DL subframe, which is subframe #3. As a result, the reference delay $n_{CQI\_ref}$ is also 4 subframes. Thus, the reference subframe $n-n_{CQI\_ref}$ is located at subframe #3, which is a flexible DL subframe. After the UE receives an A-CSI request 1232, the UE measures at 1236 the interference at subframe #3 based on the flexible subframe, and measures at 1238 the channel at subframe #1 based on the fixed subframe. Subsequently, the UE computes a CQI/PMI/RI based on the measured channel and interference, and sends at subframe #7 the A-CSI report 1234 including the CQI/PMI/RI for the flexible DL subframe.

FIG. 12C is an example diagram 1260 illustrating an example of the third case of the second approach. The example diagram 1260 is based on subframe configuration #1. An A-CSI request 1262 is sent at subframe #1, and an A-CSI report UL subframe n to send an A-CSI report 1264 is subframe #7. In FIG. 12C, the channel measurements are performed at subframe #1, which is an A-CSI request DL subframe where an A-CSI request 1262 is received. In FIG. 12C, a report delay x between the A-CSI request 1262 and the A-CSI report 1264 is greater than 4 subframes and a subframe corresponding to n−4 is a UL subframe, which is subframe #3. As a result, the reference delay $n_{CQI\_ref}$ is equal to the report delay x. Thus, the reference subframe n−n$_{CQI\_ref}$ for interference measurements is located at subframe #1, which is a fixed subframe and the A-CSI request DL subframe. After the UE receives an A-CSI request 1262, the UE measures at 1266 the channel and the interference at subframe #1 based on the fixed subframe. Subsequently, the UE computes a CQI/PMI/RI based on the measured channel and interference, and sends at subframe #7 the A-CSI report 1264 including the CQI/PMI/RI for the fixed DL subframe.

According to a third approach, CSI values measured in multiple reference subframes may be combined and reported to the eNB, where each CSI includes a respective CQI/PMI/RI. In particular, the UE may determine whether to report a single CSI or multiple CSIs based on the A-CSI report UL subframe and the report delay. The determination as to whether to report a single CSI or multiple CSIs may be further based on a location of the A-CSI request downlink subframe. If the UE determines to report multiple CSIs, the UE may, for example, compute a first CSI corresponding to a first reference subframe and compute a second CSI corresponding to a second reference subframe, and then combine the first and second CSIs to report them together. In one example, the UE may measure a channel and/or interference at the first reference subframe that is a flexible subframe, in order to compute the first CSI, and may also measure a channel and/or interference at the second reference subframe that is a fixed subframe, in order to compute the second CSI. Subsequently, the UE may combine (e.g., multiplex) the first and second CSIs to send the first and second CSIs in the same CSI report. The UE may determine a location and a type (e.g., fixed subframe or flexible subframe) of each reference subframe based on a report delay between an A-CSI request DL subframe and an A-CSI report UL subframe and/or based on the A-CSI report UL subframe.

In a first scenario of the third approach, channel measurements and interference measurements for computing each CSI value are performed in the same reference subframe, which is a DL subframe. Three cases may exist in determining the reference subframe. Assume that n is the A-CSI report UL subframe, x is the report delay, and n−x is the A-CSI request DL subframe. The location and the type of a first reference subframe n−n$_{CQI\_ref1}$ for a flexible subframe CSI and/or a second reference subframe n−n$_{CQI\_ref2}$ for a fixed subframe CSI may be determined according to the following three cases, where n$_{CQI\_ref1}$ is a reference delay between the first reference subframe and the A-CSI report UL subframe n, and n$_{CQI\_ref2}$ is a reference delay between the second reference subframe and the A-CSI report UL subframe n.

In a first case, if the report delay x=4 subframes, then n$_{CQI\_ref2}$=4 subframes and the UE will not report a CSI of a flexible subframe. In the first case, the second reference subframe n−n$_{CQI\_ref2}$ is the same as the A-CSI request DL subframe, and thus the second reference subframe n−n$_{CQI\_ref2}$ is a fixed subframe. In the first case, the UE measures the channel and the interference based on the fixed subframe at the second reference subframe, and sends the A-CSI report for the fixed subframe based on the channel and the interference. It is noted that, in the first case, channel and interference based on a flexible subframe may not be measured or reported. In a second case, if the report delay is greater than 4 subframes and a subframe corresponding to n−4 is a DL subframe, then n$_{CQI\_ref1}$=4 subframes and n$_{CQI\_ref2}$=report delay x. In the second case, the UE combines a flexible subframe CSI of the first reference subframe n−n$_{CQI\_ref1}$ that is a flexible subframe, and a fixed subframe CSI of the second reference subframe n−n$_{CQI\_ref2}$ that is a fixed subframe, and subsequently sends the A-CSI report with the flexible subframe CSI and the fixed subframe CSI in a subframe n. In a third case, if the report delay is greater than 4 subframes and a subframe corresponding to n−4 is a UL subframe or an MBSFN subframe, then n$_{CQI\_ref1}$=report delay x and the UE will not report a CSI of a flexible subframe. In the third case, the second reference subframe n−n$_{CQI\_ref2}$ may be the same as the A-CSI request DL subframe, which is a fixed subframe. Thus, the UE measures the channel and the interference based on the fixed subframe at the second reference subframe, and sends the A-CSI report for the fixed subframe based on the channel and the interference. It is noted that, in the third case, channel and interference based on a flexible subframe may not be measured or reported.

In a second scenario of the third approach, channel quality measurements and the interference measurements for each CSI are performed in different DL subframes. In particular, channel measurements for each CSI are performed at a subframe (e.g., an A-CSI request DL subframe) where an A-CSI request is received. The interference measurements are performed at a reference frame that may be a fixed subframe or a flexible subframe, depending on the subframe configuration. For the interference measurements, the UE may determine a location and a type (e.g., fixed subframe or flexible subframe) of the reference subframe based on a report delay between an A-CSI request DL subframe and an A-CSI report UL subframe and/or based on the A-CSI report UL subframe.

Three cases may exist in determining the reference subframe for the interference measurements. Assume that n is the A-CSI report UL subframe, x is the report delay, and n−x is the A-CSI request DL subframe. The location and the type of a first reference subframe n−n$_{CQI\_ref1}$ for a flexible subframe CSI and/or a second reference subframe n−n$_{CQI\_ref2}$ for a fixed subframe CSI may be determined according to the following three cases, where n$_{CQI\_ref1}$ is a reference delay between the first reference subframe and the A-CSI report UL subframe, and n$_{CQI\_ref2}$ is a reference delay between the second reference subframe and the A-CSI report UL subframe.

In a first case, if the report delay x=4 subframes, then n$_{CQI\_ref2}$=4 subframes and the UE will not report a CSI of a flexible subframe. In the first case, the second reference subframe n−n$_{CQI\_ref2}$ for the interference measurements is a fixed subframe and is the same as the A-CSI request DL subframe. Thus, in the first case, the UE measures both the channel and the interference for the fixed subframe CSI based on the fixed subframe at the A-CSI request DL subframe, sends the A-CSI report for the fixed subframe based on the channel and the interference. In a second case, if the report delay is greater than 4 subframes and a subframe corresponding to n−4 is a DL subframe, then n$_{CQI\_ref1}$=4 subframes and n$_{CQI\_ref2}$=report delay x. In particular, in the second case, the channel for a flexible subframe CSI is measured at the A-CSI request DL subframe while the interference for the flexible subframe CSI is measured at a separate reference subframe, in order to compute the flexible subframe CSI of the first reference subframe n−n$_{CQI\_ref1}$. Further, in the second case, the channel and the interference for a fixed subframe CSI are measured at the A-CSI request DL subframe, in order to compute the fixed subframe CSI of the second reference subframe n−n$_{CQI\_ref2}$. In the second case, the UE subsequently combines the flexible subframe CSI corresponding to the first reference subframe n−n$_{CQI\_ref1}$ that is a flexible subframe, and the fixed subframe CSI corresponding to the second reference subframe $n-n_{CQI\_ref2}$ that is a fixed subframe, and sends the A-CSI report with the flexible subframe CSI and the fixed subframe CSI in a subframe n. In a third case, if the report delay is greater than 4 subframes and a subframe corresponding to n−4 is a UL subframe or an MBSFN, then $n_{CQI\_ref2}$=report delay x and the UE will not report a CSI of a flexible subframe. In the third case, the second reference subframe $n-n_{CQI\_ref2}$ for the interference measurements may be the same as the A-CSI request DL subframe, which is a fixed subframe, and thus both the channel and the interference for the fixed subframe CSI may be measured at the A-CSI request DL subframe. Therefore, the UE measures the channel and the interference based on the fixed subframe, and sends the A-CSI report for the fixed subframe based on the channel and the interference FIGS. 13A-13C are example diagrams illustrating a first scenario of the third approach. FIG. 13A is an example diagram 1300 illustrating an example of the first case of the third approach's first scenario. The example diagram 1300 is based on subframe configuration #0. An A-CSI request 1302 is received at subframe #0, and an A-CSI report UL subframe n to send an A-CSI report 1304 is subframe #4. In FIG. 13A, because a report delay x between the A-CSI request 1302 and the A-CSI report 1304 is 4 subframes, the reference delay $n_{CQI\_ref2}$ is also 4 subframes and the UE will not report a CSI of a flexible subframe. Thus, the location of the second reference subframe $n-n_{CQI\_ref2}$ is the same as a location of the A-CSI request DL subframe, at subframe #0. In the example of FIG. 13A, the A-CSI request DL subframe is subframe #0 and is a fixed subframe. Therefore, in FIG. 13A, the UE measures at 1306 the channel and the interference at subframe #0 based on the fixed subframe. Subsequently, the UE computes a fixed subframe CSI based on the measured channel and interference, and sends at subframe #4 an A-CSI report 1304 including the fixed subframe CSI for the fixed subframe.

FIG. 13B is an example diagram 1330 illustrating an example of the second case of the third approach's first scenario. The example diagram 1330 is based on subframe configuration #2. An A-CSI request 1332 is received at subframe #1, and an A-CSI report UL subframe n to send an A-CSI report 1334 is subframe #7. In FIG. 13B, a report delay x between the A-CSI request 1332 and the A-CSI report 1334 is greater than 4 subframes and a subframe corresponding to n−4 is a DL subframe, which is subframe #3. As a result, the first reference delay $n_{CQI\_ref1}$ is 4 subframes and the second reference delay $n_{CQI\_ref2}$ is equal to the report delay x. Thus, the first reference subframe $n-n_{CQI\_ref1}$ is located at subframe #3, which is a flexible subframe, and the second reference subframe $n-n_{CQI\_ref2}$ is located at subframe #1, which is a fixed subframe. After the UE receives the A-CSI request 1332, the UE measures at 1336 the channel and the interference at subframe #3 based on the flexible subframe to compute a flexible subframe CSI, and measures at 1338 the channel and the interference at subframe #1 based on the fixed subframe to compute a fixed subframe CSI. Subsequently, the UE combines the flexible subframe CSI and the fixed subframe CSI, and sends at subframe #7 an A-CSI report 1334 including the flexible subframe CSI and the fixed subframe CSI.

FIG. 13C is an example diagram 1360 illustrating an example of the third case of the third approach's first scenario. The example diagram 1360 is based on subframe configuration #1. An A-CSI request 1362 is received at subframe #1, and an A-CSI report UL subframe n to send an A-CSI report 1364 is subframe #7. In FIG. 13C, a report delay x between the A-CSI request 1362 and the A-CSI report 1364 is greater than 4 subframes and a subframe corresponding to n−4 is a UL subframe, which is subframe #3. As a result, the reference delay $n_{CQI\_ref2}$ is equal to the report delay x, and the UE will not report a CSI of a flexible subframe. Thus, the second reference subframe $n-n_{CQI\_ref2}$ is located at subframe #1, which is a fixed subframe and the A-CSI request DL subframe. After the UE receives the A-CSI request 1362, the UE measures at 1366 the channel and the interference at subframe #1 based on the fixed subframe. Subsequently, the UE computes a CSI based on the measured channel and interference, and sends at subframe #7 an A-CSI report 1334 including the CSI for the fixed subframe.

Figure 14A:
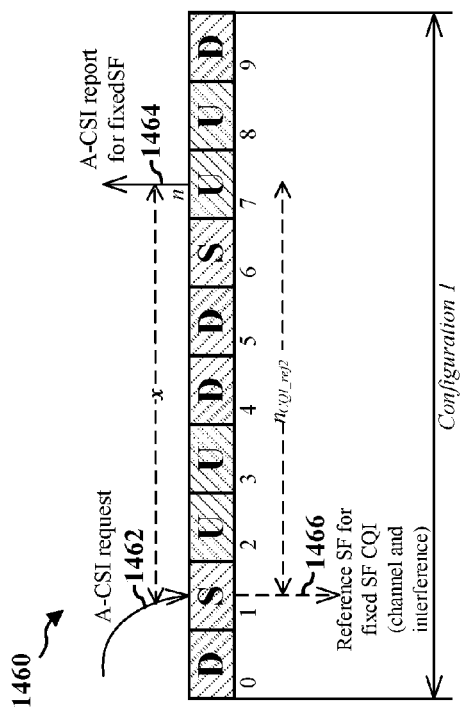
FIGS. 14A-14C are example diagrams illustrating the second scenario of the third approach.
Figure 14B:
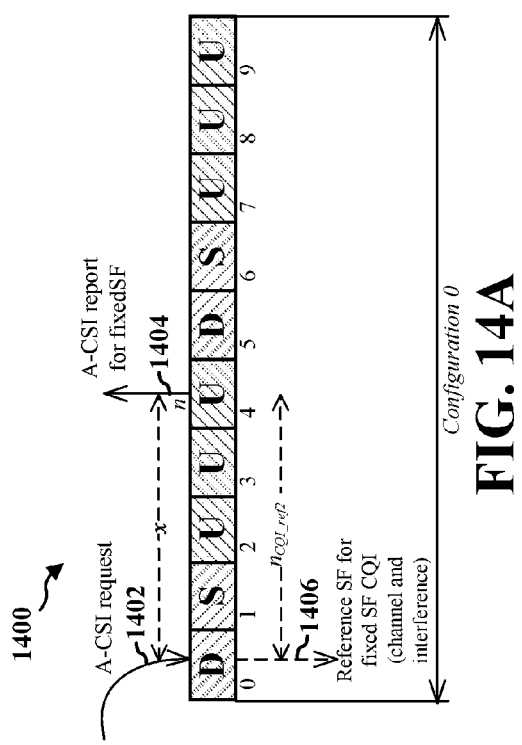
Figure 14C:
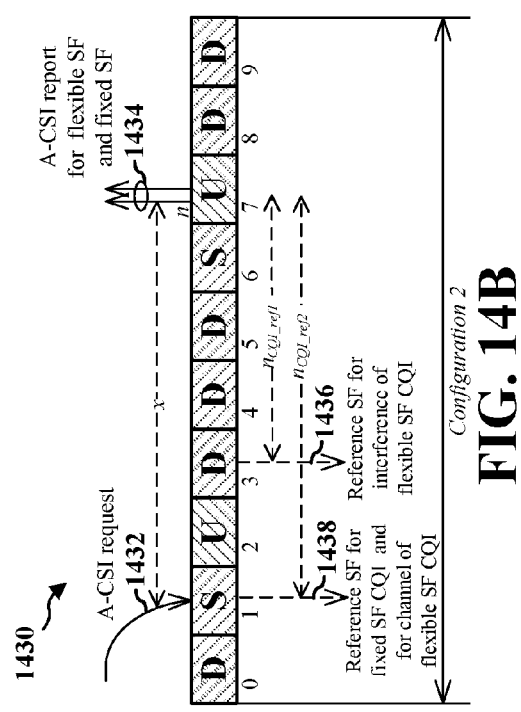

FIGS. 14A-14C are example diagrams illustrating a second scenario of the third approach. FIG. 14A is an example diagram 1400 illustrating an example of the first case of the third approach's second scenario. The example diagram 1400 is based on subframe configuration #0, and an A-CSI report UL subframe n to send an A-CSI report 1404 is subframe #4. In FIG. 14A, the channel measurements are performed at subframe #0, which is an A-CSI request DL subframe where an A-CSI request 1402 is received. In FIG. 14A, because a report delay x between the A-CSI request 1402 and the A-CSI report 1404 is 4 subframes, the reference delay $n_{CQI\_ref2}$ is also 4 subframes and the UE will not report a CSI of a flexible subframe. Thus, the location of the second reference subframe $n-n_{CQI\_ref2}$ for interference measurements is the same as a location of the A-CSI request DL subframe, at subframe #0. In the example of FIG. 14A, the A-CSI request DL subframe is subframe #0 and is a fixed subframe. Therefore, in FIG. 14A, the UE measures at 1406 the channel and the interference at subframe #0 based on the fixed subframe. Subsequently, the UE computes a fixed subframe CSI based on the measured channel and interference, and sends at subframe #4 an A-CSI report 1404 including the fixed subframe CSI for the fixed subframe.

FIG. 14B is an example diagram 1430 illustrating an example of the second case of the third approach's second scenario. The example diagram 1430 is based on subframe configuration #2, and an A-CSI report UL subframe n to send an A-CSI report 1434 is subframe #7. In FIG. 14B, a report delay x between an A-CSI request 1432 and the A-CSI report 1434 is greater than 4 subframes and a subframe corresponding to n−4 is a DL subframe, which is subframe #3. As a result, the first reference delay $n_{CQI\_ref1}$ is 4 subframes and the second reference delay $n_{CQI\_ref2}$ is equal to the report delay x. Thus, the first reference subframe $n-n_{CQI\_ref1}$ is located at subframe #3, which is a flexible subframe, and the second reference subframe $n-n_{CQI\_ref2}$ is located at subframe #1, which is a fixed subframe. After the UE receives the A-CSI request 1432, in order to compute a flexible subframe CSI, the UE performs at 1438 the channel measurements at subframe #1, which is an A-CSI request DL subframe where the A-CSI request 1432 is received, based on the fixed subframe, and further performs at 1436 the interference measurements at subframe #3, which is the first reference subframe $n-n_{CQI\_ref1}$ for interference measurements, based on the flexible subframe. Further, after the UE receives an A-CSI request 1432, in order to compute a fixed subframe CSI, the UE performs at 1438 the channel measurements and the interference measurements at subframe #1, which is the A-CSI request DL subframe, based on the fixed subframe. Subsequently, the UE combines the flexible subframe CSI and the fixed subframe CSI, and sends at subframe #7 the A-CSI report 1434 including the flexible subframe CSI and the fixed subframe CSI.

FIG. 14C is an example diagram 1460 illustrating an example of the third case of the third approach's second scenario. The example diagram 1460 is based on subframe configuration #1, and an A-CSI report UL subframe n to send an A-CSI report 1464 is subframe #7. In FIG. 14C, the channel measurements are performed at subframe #1, which is an A-CSI request DL subframe where an A-CSI request 1462 is received. In FIG. 14C, a report delay x between the A-CSI request 1462 and the A-CSI report 1464 is greater than 4 subframes and a subframe corresponding to n−4 is a UL subframe, which is subframe #3. As a result, the reference delay $n_{CQI\_ref2}$ for interference measurements is equal to the report delay x, and the UE will not report a CSI of a flexible subframe. Thus, the second reference subframe n−$n_{CQI\_ref2}$ for interference measurements is located at subframe #1, which is a fixed subframe and the A-CSI request DL subframe. After the UE receives the A-CSI request 1462, the UE measures at 1466 the channel and the interference at subframe #1 based on the fixed subframe. Subsequently, the UE computes a CSI based on the measured channel and interference, and sends at subframe #7 an A-CSI report 1464 including the CSI for the fixed subframe.

Figure 15:
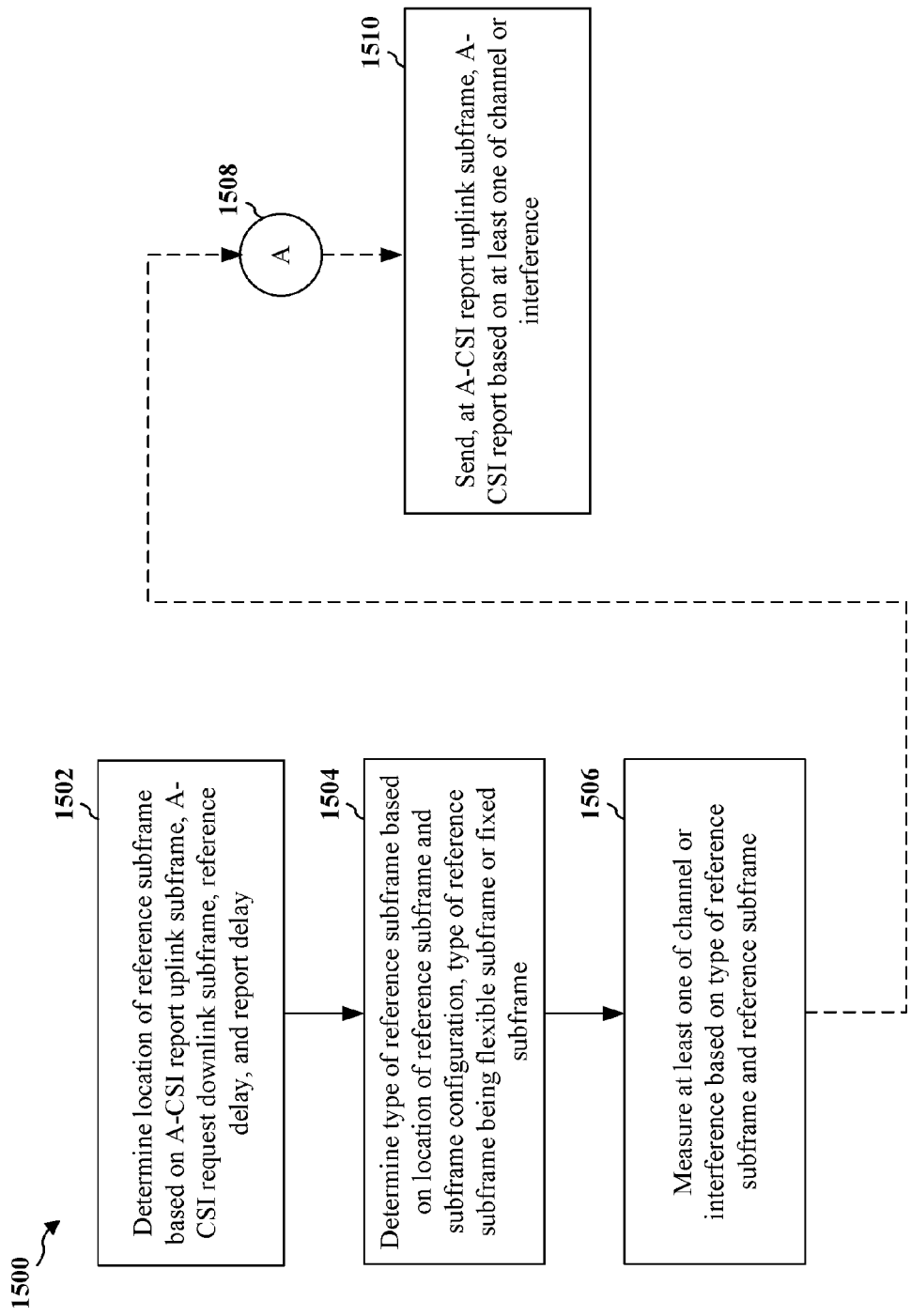
FIG. 15 is a flow chart of a method of wireless communication.

FIG. 15 is a flow chart 1500 of a method of wireless communication. The method may be performed by a UE. At 1502, the UE determines a location of a reference subframe based on an A-CSI report uplink subframe, an A-CSI request downlink subframe, a reference delay, and a report delay. In an aspect, the reference delay is a first delay value before the A-CSI report uplink subframe, and the report delay is a second delay value between the A-CSI request downlink subframe and the A-CSI report uplink subframe. At 1504, the UE determines a type of the reference subframe based on the location of the reference subframe and a subframe configuration, the type of the reference subframe being a flexible subframe or a fixed subframe. For example, as discussed supra, The location and the type of the reference subframe n−$n_{CQI\_ref}$ may be determined based on at least one of the A-CSI report UL subframe n, the A-CSI request DL subframe n−x, the reference delay $n_{CQI\_ref}$, and the report delay x. As discussed supra, the reference subframe may be a fixed subframe or a flexible subframe, depending on the subframe configuration.

At 1506, the UE measures at least one of a channel or interference based on the reference subframe and the type of the reference subframe. As discussed supra, at least one of a channel or interference is measured at the reference subframe based on the type of the reference subframe.

Figure 16:
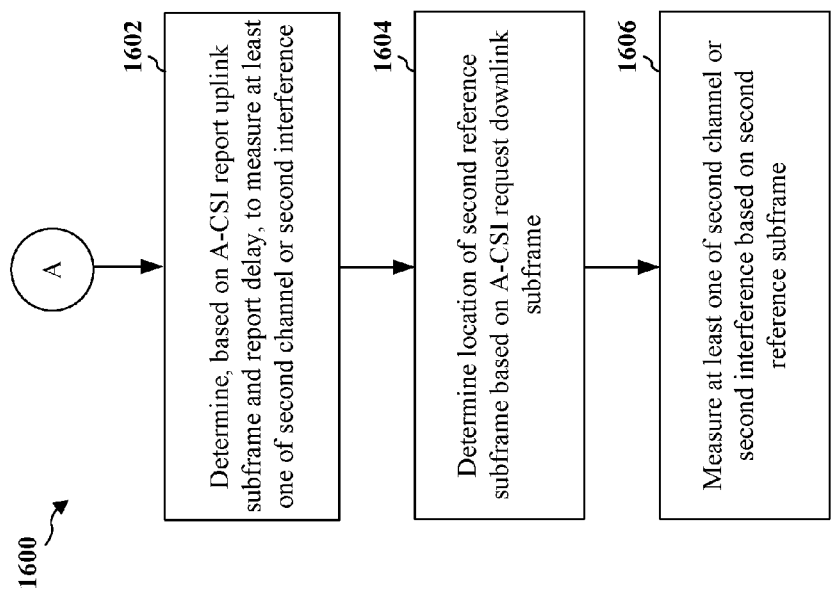
FIG. 16 is a flow chart of a method of wireless communication expanding from the flow chart of FIG. 15

At 1508, the UE may perform the method illustrated in FIG. 16. Further explanations are provided infra.

At 1510, the UE sends, at the A-CSI report uplink subframe, an A-CSI report based on the at least one of the channel or the interference. For example, as discussed supra, the UE sends an A-CSI report including the CQI/PMI/RI that is based on the measured channel and/or the interference.

In an aspect, the reference subframe is located a number of subframes prior to the A-CSI report uplink subframe, where the number of subframes is based on either the first delay value or the second delay value. In such an aspect, the first delay value of the reference delay corresponds to four subframes. For example, as discussed supra, the reference subframe may be expressed as n−$n_{CQI\_ref}$ where $n_{CQI\_ref}$ is a reference delay between the reference subframe and the A-CSI report UL subframe. For example, referring back to FIGS. 11A-11C, in the first and second cases of the first approach, the reference delay $n_{CQI\_ref}$ is 4 subframes, and in the third case of the first approach, the reference delay $n_{CQI\_ref}$ is the report delay x.

In an aspect, the channel and the interference are measured at the reference subframe when the report delay corresponds to four subframes, the reference subframe corresponding to the A-CSI request downlink subframe. In such an aspect, the channel and interference are measured based on the type of the reference subframe that is the fixed subframe. For example, referring back to FIG. 11A, because a report delay x between the A-CSI request 1102 and the A-CSI report 1104 is 4 subframes, the reference delay $n_{CQI\_ref}$ is also 4 subframes. For example, referring back to FIG. 11A, the UE measures at 1106 the channel and the interference at subframe #0 based on the fixed subframe.

In an aspect, the reference subframe is located four subframes prior to the A-CSI report uplink subframe when the report delay is greater than four subframes and a subframe located four subframes prior to the A-CSI report uplink subframe is a downlink subframe. In such an aspect, according to a first case, the channel and interference may be measured based on the type of the reference subframe that is the flexible subframe. For example, referring back to FIG. 11B, a report delay x between the A-CSI request 1132 and the A-CSI report 1134 is greater than 4 subframes and a subframe corresponding to n−4 is a DL subframe, which is subframe #3, and thus as a result, the reference delay $n_{CQI\_ref}$ is also 4 subframes. For example, referring back to FIG. 11B, the UE measures at 1136 the channel and the interference at the reference subframe (subframe #3) based on the flexible subframe. In such an aspect, according to a second case, the channel may be measured at the A-CSI request downlink subframe and the interference is measured at the reference subframe that is located four subframes prior to the A-CSI report uplink subframe. In such an aspect, according to the second case, the interference may be measured based on the type of the reference subframe that is the flexible subframe and the channel is measured based on the type of the A-CSI request downlink subframe that is the fixed subframe. For example, referring back to FIG. 12B, the UE measures at 1236 the interference at the reference subframe (subframe #3) based on the flexible subframe, and measures at 1238 the channel at the A-CSI request DL subframe (subframe #1) based on the fixed subframe.

In an aspect, the reference subframe corresponds to the A-CSI request downlink subframe when the report delay is greater than four subframes and a subframe located four subframes prior to the A-CSI report uplink subframe is an uplink subframe or an MBSFN subframe. In such an aspect, the channel and interference are measured based on the type of the A-CSI request downlink subframe that is a fixed subframe. For example, referring back to FIG. 11C, a report delay x between the A-CSI request 1162 and the A-CSI report 1164 is greater than 4 subframes and a subframe corresponding to n−4 is a UL subframe, which is subframe #3, and as a result, the reference delay $n_{CQI\_ref}$ is equal to the report delay x. For example, referring back to FIG. 11C, the UE measures at 1166 the channel and the interference at subframe #1 based on the fixed subframe.

FIG. 16 is a flow chart 1600 of a method of wireless communication expanding from the flow chart 1500 of FIG. 15. The method may be performed by a UE. At 1602, the UE determines, based on the A-CSI report uplink subframe and the report delay, to measure at least one of a second channel or second interference. At 1604, the UE determines a location of a second reference subframe based on the A-CSI request downlink subframe. At 1606, the UE measures at least one of the second channel or the second interference based on the second reference subframe. In an aspect, the A-CSI report sent at the A-CSI report uplink subframe at 1510 may include a CQI based on the at least one of the channel or the interference and the at least one of the second channel or the second interference. In an aspect, the determination to measure the at least one of the second channel or the second interference is further based on a location of the A-CSI request downlink subframe.

As discussed supra, the UE may determine whether to report a single CSI or multiple CSIs based on the A-CSI report UL subframe and the report delay, where each CSI includes a respective CQI/PMI/RI. If the UE determines to report multiple CSIs, the UE may measure a channel and/or interference at the first subframe that is a fixed reference subframe, in order to compute a first CSI, and may also measure a channel and/or interference at the second reference subframe that is a flexible subframe, in order to compute the second CSI. Subsequently, as discussed supra, the UE may combine (e.g., multiplex) the first and second CSIs to send the first and second CSIs in the same CSI report. As discussed supra, the UE may determine a location and a type (e.g., fixed subframe or flexible subframe) of each reference subframe based on a report delay between an A-CSI request DL subframe and an A-CSI report UL subframe and/or based on the A-CSI report UL subframe.

In an aspect, the reference delay corresponds to four subframes and the second reference subframe is the A-CSI request downlink subframe when the report delay is greater than four subframes and a subframe located four subframes prior to the A-CSI report uplink subframe is a downlink subframe. In such an aspect, according to one scenario, the channel and the interference may be measured based on the type of the reference subframe that is the flexible subframe and the second channel and the second interference are measured based on a type of the second reference subframe that is the fixed subframe, the second reference subframe corresponding to the A-CSI request downlink subframe. For example, referring back to FIG. 13B, a report delay x between the A-CSI request 1332 and the A-CSI report 1334 is greater than 4 subframes and a subframe corresponding to n−4 is a DL subframe, which is subframe #3, and as a result, the first reference delay $n_{CQI\_ref1}$ is 4 subframes and the second reference delay $n_{CQI\_ref2}$ is the report delay x. For example, referring back to FIG. 13B, the UE measures at 1336 the channel and the interference at subframe #3 based on the flexible subframe to compute a flexible subframe CSI, and measures at 1338 the channel and the interference at subframe #1 based on the fixed subframe to compute a fixed subframe CSI.

In such an aspect, according to another scenario, the interference may be measured based on the type of the reference subframe that is the flexible subframe and the channel is measured based on the type of the A-CSI request downlink subframe that is the fixed subframe, and the second channel and the second interference are measured based on a type of the second reference subframe that is the fixed subframe, the second reference subframe corresponding to the A-CSI request downlink subframe. For example, referring back to FIG. 14B, in order to compute a flexible subframe CSI, the UE performs at 1438 the channel measurements at subframe #1, which is the second subframe and an A-CSI request DL subframe where the A-CSI request 1432 is received, based on the fixed subframe and further performs at 1436 the interference measurements at subframe #3, which is the first reference subframe $n-n_{CQI\_ref1}$ for interference measurements, based on the flexible subframe.

For example, referring back to FIG. 14, in order to compute a fixed subframe CSI, the UE performs at 1438 the channel measurements and the interference measurements at subframe #1, which is the A-CSI request DL subframe, based on the fixed subframe, where the A-CSI request DL subframe is the second reference subframe.

Figure 17:
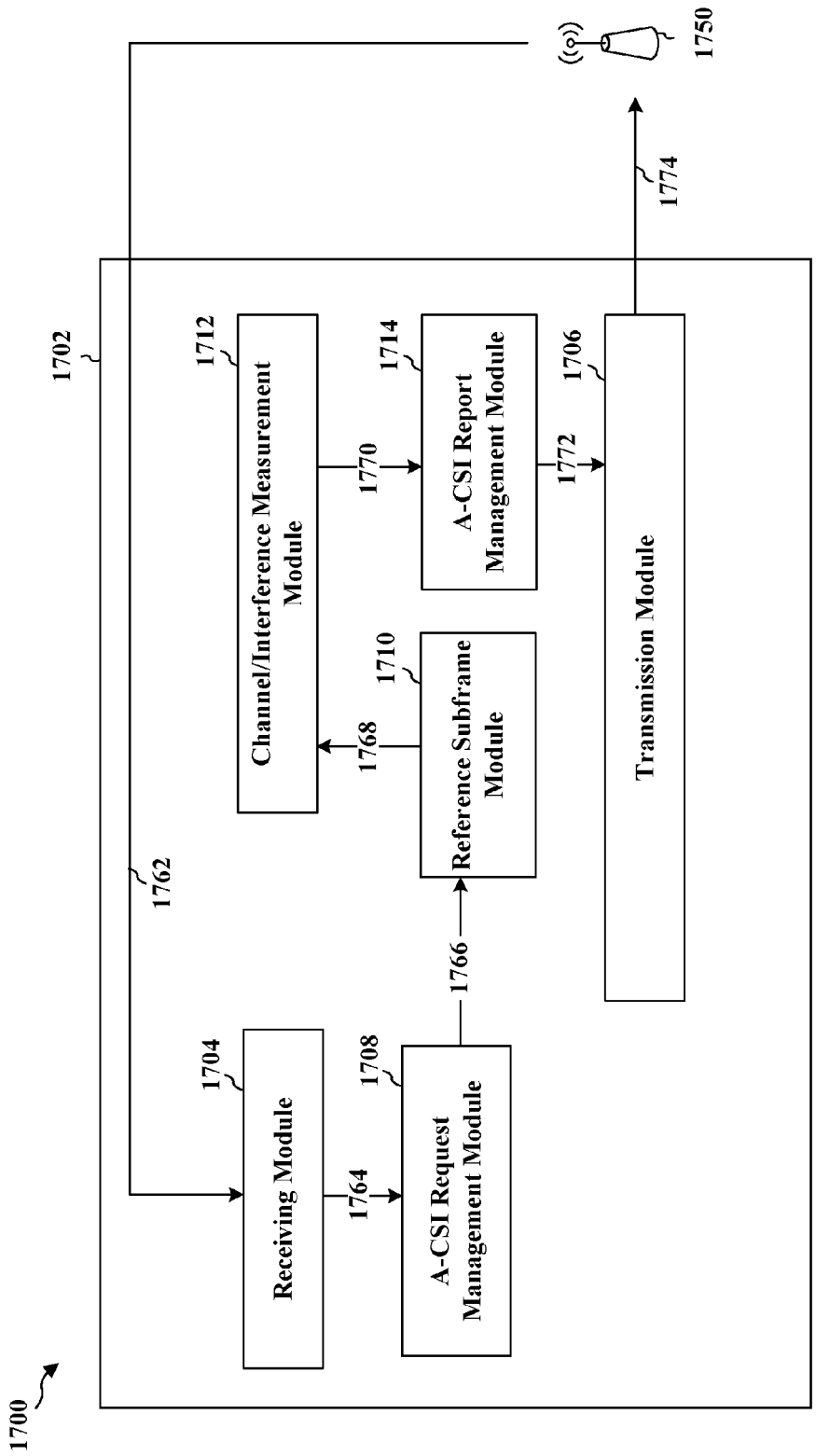
FIG. 17 is a conceptual data flow diagram illustrating the data flow between different modules/means/components in an exemplary apparatus.

FIG. 17 is a conceptual data flow diagram 1700 illustrating the data flow between different modules/means/components in an exemplary apparatus 1702. The apparatus may be a UE. The apparatus includes a receiving module 1704, a transmission module 1706, an A-CSI request management module 1708, a reference subframe module 1710, a channel/interference measurement module 1712, and an A-CSI report management module 1714.

The reference subframe module 1710 determines a location of a reference subframe based on an A-CSI report uplink subframe, an A-CSI request downlink subframe, a reference delay, and a report delay. In an aspect, the reference delay is a first delay value before the A-CSI report uplink subframe, and the report delay is a second delay value between the A-CSI request downlink subframe and the A-CSI report uplink subframe. The A-CSI request downlink subframe is a subframe where the apparatus receives, via the receiving module 1704 at 1762 and the A-CSI request management module 1708 at 1764, an A-CSI request from an eNB 1750, and information on the A-CSI request downlink subframe is sent to the reference subframe module 1710 at 1766. At 1504, the reference subframe module 1710 determines a type of the reference subframe based on the location of the reference subframe and a subframe configuration, the type of the reference subframe being a flexible subframe or a fixed subframe. The channel/interference measurement module 1712 measures at least one of a channel or interference based on the reference subframe and the type of the reference subframe, where information on the received from the reference subframe module 1710 at 1768. The A-CSI report management module 1714 sends, at the A-CSI report uplink subframe via the A-CSI report management module 1714 at 1772 and the transmission module 1706 at 1774, an A-CSI report based on the at least one of the channel or the interference received from the channel/interference measurement module 1712 via 1770.

In an aspect, the reference subframe is located a number of subframes prior to the A-CSI report uplink subframe, where the number of subframes is based on either the first delay value or the second delay value. In such an aspect, the first delay value of the reference delay corresponds to four subframes.

In an aspect, the channel and the interference are measured via the channel/interference measurement module 1712 at the reference subframe when the report delay corresponds to four subframes, the reference subframe corresponding to the A-CSI request downlink subframe. In such an aspect, the channel and interference are measured via the channel/interference measurement module 1712 based on the type of the reference subframe that is the fixed subframe.

In an aspect, the reference subframe is located four subframes prior to the A-CSI report uplink subframe when the report delay is greater than four subframes and a subframe located four subframes prior to the A-CSI report uplink subframe is a downlink subframe. In such an aspect, according to a first case, the channel and interference may be measured via the channel/interference measurement module 1712 based on the type of the reference subframe that is the flexible subframe. In such an aspect, according to a second case, the channel may be measured at the channel/interference measurement module 1712 at the A-CSI request downlink subframe and the interference is measured via the channel/interference measurement module 1712 at the reference subframe that is located four subframes prior to the A-CSI report uplink subframe. In such an aspect, according to the second case, the interference may be measured via the channel/interference measurement module 1712 based on the type of the reference subframe that is the flexible subframe and the channel is measured based on the type of the A-CSI request downlink subframe that is the fixed subframe.

In an aspect, the reference subframe corresponds to the A-CSI request downlink subframe when the report delay is greater than four subframes and a subframe located four subframes prior to the A-CSI report uplink subframe is an uplink subframe or an MBSFN subframe. In such an aspect, the channel and interference are measured via the channel/interference measurement module 1712 based on the type of the A-CSI request downlink subframe that is a fixed subframe.

In an aspect, the reference subframe module 1710 determines, based on the A-CSI report uplink subframe and the report delay, to measure at least one of a second channel or second interference. The reference subframe module 1710 determines a location of a second reference subframe based on the A-CSI request downlink subframe. The channel/interference measurement module 1712 measures at least one of the second channel or the second interference based on the second reference subframe, where information on the second reference subframe is received from the reference subframe module 1710 at 1768. In an aspect, the A-CSI report sent at the A-CSI report uplink subframe, via the A-CSI report management module 1714 at 1772 and the transmission module 1706 at 1774, includes a CQI based on the at least one of the channel or the interference and the at least one of the second channel or the second interference. In an aspect, the determination to measure the at least one of the second channel or the second interference is further based on a location of the A-CSI request downlink subframe.

In an aspect, the reference delay corresponds to four subframes and the second reference subframe is the A-CSI request downlink subframe when the report delay is greater than four subframes and a subframe located four subframes prior to the A-CSI report uplink subframe is a downlink subframe. In such an aspect, according to one scenario, the channel and the interference may be measured via the channel/interference measurement module 1712 based on the type of the reference subframe that is the flexible subframe and the second channel and the second interference are measured via the channel/interference measurement module 1712 based on a type of the second reference subframe that is the fixed subframe, the second reference subframe corresponding to the A-CSI request downlink subframe. In such an aspect, according to another scenario, the interference may be measured via the channel/interference measurement module 1712 based on the type of the reference subframe that is the flexible subframe and the channel is measured via the channel/interference measurement module 1712 based on the type of the A-CSI request downlink subframe that is the fixed subframe, and the second channel and the second interference are measured via the channel/interference measurement module 1712 based on a type of the second reference subframe that is the fixed subframe, the second reference subframe corresponding to the A-CSI request downlink subframe.

The apparatus may include additional modules that perform each of the steps of the algorithm in the aforementioned flow charts of FIGS. 15 and 16. As such, each step in the aforementioned flow charts of FIGS. 15 and 16 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 18:
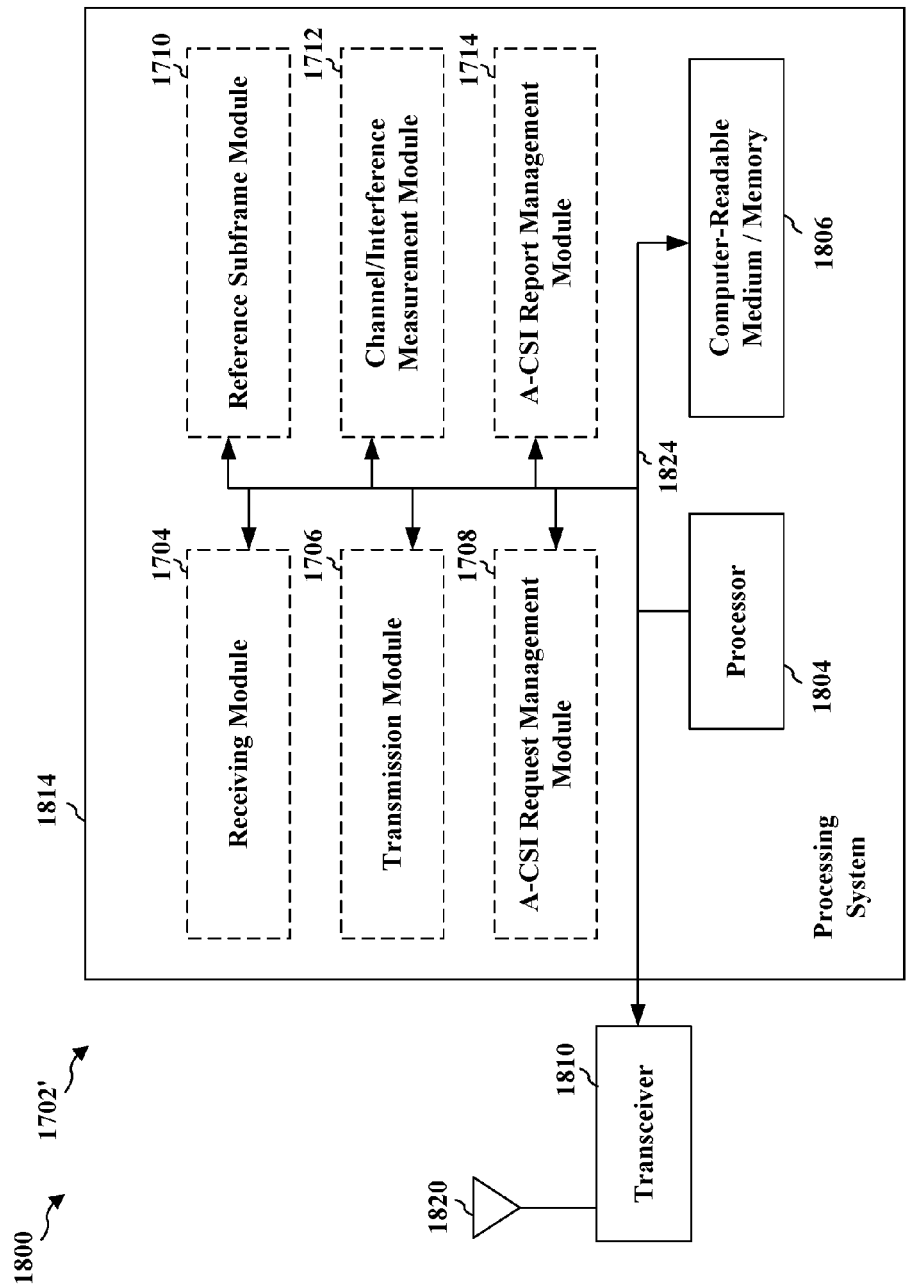
FIG. 18 is a diagram illustrating an example of a hardware implementation for an apparatus employing a processing system.

FIG. 18 is a diagram 1800 illustrating an example of a hardware implementation for an apparatus 1702' employing a processing system 1814. The processing system 1814 may be implemented with a bus architecture, represented generally by the bus 1824. The bus 1824 may include any number of interconnecting buses and bridges depending on the specific application of the processing system 1814 and the overall design constraints. The bus 1824 links together various circuits including one or more processors and/or hardware modules, represented by the processor 1804, the modules 1704, 1706, 1708, 1710, 1712, 1714, and the computer-readable medium/memory 1806. The bus 1824 may also link various other circuits such as timing sources, peripherals, voltage regulators, and power management circuits, which are well known in the art, and therefore, will not be described any further.

The processing system 1814 may be coupled to a transceiver 1810. The transceiver 1810 is coupled to one or more antennas 1820. The transceiver 1810 provides a means for communicating with various other apparatus over a transmission medium. The transceiver 1810 receives a signal from the one or more antennas 1820, extracts information from the received signal, and provides the extracted information to the processing system 1814, specifically the receiving module 1704. In addition, the transceiver 1810 receives information from the processing system 1814, specifically the transmission module 1706, and based on the received information, generates a signal to be applied to the one or more antennas 1820. The processing system 1814 includes a processor 1804 coupled to a computer-readable medium/memory 1806. The processor 1804 is responsible for general processing, including the execution of software stored on the computer-readable medium/memory 1806. The software, when executed by the processor 1804, causes the processing system 1814 to perform the various functions described supra for any particular apparatus. The computer-readable medium/memory 1806 may also be used for storing data that is manipulated by the processor 1804 when executing software. The processing system further includes at least one of the modules 1704, 1706, 1708, 1710, 1712, and 1714. The modules may be software modules running in the processor 1804, resident/stored in the computer readable medium/memory 1806, one or more hardware modules coupled to the processor 1804, or some combination thereof. The processing system 1814 may be a component of the UE 650 and may include the memory 660 and/or at least one of the TX processor 668, the RX processor 656, and the controller/processor 659.

In one configuration, the apparatus 1702/1702' for wireless communication includes means for determining a location of a reference subframe based on an aperiodic channel state information (A-CSI) report uplink subframe, an A-CSI request downlink subframe, a reference delay, and a report delay. In an aspect, the reference delay is a first delay value before the A-CSI report uplink subframe, and the report delay is a second delay value between the A-CSI request downlink subframe and the A-CSI report uplink subframe. The apparatus 1702/1702' includes means for determining a type of the reference subframe based on the location of the reference subframe and a subframe configuration, the type of the reference subframe being a flexible subframe or a fixed subframe. The apparatus 1702/1702' includes means for measuring at least one of a channel or interference based on the reference subframe and the type of the reference subframe. The apparatus 1702/1702' includes means for sending, at the A-CSI report uplink subframe, an A-CSI report based on the at least one of the channel or the interference.

The apparatus 1702/1702' may further include means for determining, based on the A-CSI report uplink subframe and the report delay, to measure at least one of a second channel or second interference, means for determining a location of a second reference subframe based on the A-CSI request downlink subframe, and means for measuring at least one of the second channel or the second interference based on the second reference subframe.

The aforementioned means may be one or more of the aforementioned modules of the apparatus 1702 and/or the processing system 1814 of the apparatus 1702' configured to perform the functions recited by the aforementioned means. As described supra, the processing system 1814 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications in a time division duplex (TDD) long term evolution (LTE) based network, comprising:
   determining a location of a reference subframe based on an aperiodic channel state information (A-CSI) report uplink subframe, an A-CSI request downlink subframe, a reference delay, and a report delay, wherein the reference delay is a first delay value before the A-CSI report uplink subframe, and wherein the report delay is a second delay value between the A-CSI request downlink subframe and the A-CSI report uplink subframe;
   determining a type of the reference subframe based on the location of the reference subframe and a subframe configuration, the type of the reference subframe being a flexible subframe or a fixed subframe;
   measuring at least one of a channel or interference based on the reference subframe and the type of the reference subframe; and
   sending, at the A-CSI report uplink subframe, an A-CSI report based on the at least one of the channel or the interference.

2. The method of claim 1, wherein the reference subframe is located a number of subframes prior to the A-CSI report uplink subframe, wherein the number of subframes is based on either the first delay value or the second delay value.

3. The method of claim 2, wherein the first delay value of the reference delay corresponds to four subframes.

4. The method of claim 1, wherein the channel and the interference are measured at the reference subframe when the report delay corresponds to four subframes, the reference subframe corresponding to the A-CSI request downlink subframe.

5. The method of claim 4, wherein the channel and interference are measured based on the type of the reference subframe that is the fixed subframe.

6. The method of claim 1, wherein the reference subframe is located four subframes prior to the A-CSI report uplink subframe when the report delay is greater than four subframes and a subframe located four subframes prior to the A-CSI report uplink subframe is a downlink subframe.

7. The method of claim 6, wherein the channel and interference are measured based on the type of the reference subframe that is the flexible subframe.

8. The method of claim 6, wherein the channel is measured at the A-CSI request downlink subframe and the interference is measured at the reference subframe that is located four subframes prior to the A-CSI report uplink subframe.

9. The method of claim 8, wherein the interference is measured based on the type of the reference subframe that is the flexible subframe and the channel is measured based on the type of the A-CSI request downlink subframe that is the fixed subframe.

10. The method of claim 1, wherein the reference subframe corresponds to the A-CSI request downlink subframe when the report delay is greater than four subframes and a subframe located four subframes prior to the A-CSI report uplink subframe is an uplink subframe or a multicast broadcast single frequency network (MBSFN) subframe.

11. The method of claim 10, wherein the channel and interference are measured based on the type of the A-CSI request downlink subframe that is a fixed subframe.

12. The method of claim 1, further comprising:
determining, based on the A-CSI report uplink subframe and the report delay, to measure at least one of a second channel or second interference;
determining a location of a second reference subframe based on the A-CSI request downlink subframe; and
measuring at least one of the second channel or the second interference based on the second reference subframe.

13. The method of claim 12, wherein the determination to measure the at least one of the second channel or the second interference is further based on a location of the A-CSI request downlink subframe.

14. The method of claim 12, wherein the A-CSI report sent at the A-CSI report uplink subframe includes a channel quality indicator (CQI) based on the at least one of the channel or the interference and the at least one of the second channel or the second interference.

15. The method of claim 12, wherein the reference delay corresponds to four subframes and the second reference subframe is the A-CSI request downlink subframe when the report delay is greater than four subframes and a subframe located four subframes prior to the A-CSI report uplink subframe is a downlink subframe.

16. The method of claim 15, wherein the channel and the interference are measured based on the type of the reference subframe that is the flexible subframe and the second channel and the second interference are measured based on a type of the second reference subframe that is the fixed subframe, the second reference subframe corresponding to the A-CSI request downlink subframe.

17. The method of claim 15, wherein the interference is measured based on the type of the reference subframe that is the flexible subframe and the channel is measured based on the type of the A-CSI request downlink subframe that is the fixed subframe, and wherein the second channel and the second interference are measured based on a type of the second reference subframe that is the fixed subframe, the second reference subframe corresponding to the A-CSI request downlink subframe.

18. An apparatus for wireless communication in a time division duplex (TDD) long term evolution (LTE) based network, comprising:
a memory; and
at least one processor coupled to the memory and configured to:
determine a location of a reference subframe based on an aperiodic channel state information (A-CSI) report uplink subframe, an A-CSI request downlink subframe, a reference delay, and a report delay, wherein the reference delay is a first delay value before the A-CSI report uplink subframe, and wherein the report delay is a second delay value between the A-CSI request downlink subframe and the A-CSI report uplink subframe;
determine a type of the reference subframe based on the location of the reference subframe and a subframe configuration, the type of the reference subframe being a flexible subframe or a fixed subframe;
measure at least one of a channel or interference based on the reference subframe and the type of the reference subframe; and
send, at the A-CSI report uplink subframe, an A-CSI report based on the at least one of the channel or the interference.

19. The apparatus of claim 18, wherein the reference subframe is located a number of subframes prior to the A-CSI report uplink subframe, wherein the number of subframes is based on either the first delay value or the second delay value.

20. The apparatus of claim 18, wherein the channel and the interference are measured at the reference subframe when the report delay corresponds to four subframes, the reference subframe corresponding to the A-CSI request downlink subframe.

21. The apparatus of claim 20, wherein the channel and interference are measured based on the type of the reference subframe that is the fixed subframe.

22. The apparatus of claim 18, wherein the reference subframe is located four subframes prior to the A-CSI report uplink subframe when the report delay is greater than four subframes and a subframe located four subframes prior to the A-CSI report uplink subframe is a downlink subframe.

23. The apparatus of claim 22, wherein the channel and interference are measured based on the type of the reference subframe that is the flexible subframe.

24. The apparatus of claim 22, wherein the channel is measured at the A-CSI request downlink subframe and the interference is measured at the reference subframe that is located four subframes prior to the A-CSI report uplink subframe.

25. The apparatus of claim 24, wherein the interference is measured based on the type of the reference subframe that is the flexible subframe and the channel is measured based on the type of the A-CSI request downlink subframe that is the fixed subframe.

26. The apparatus of claim 18, wherein the reference subframe corresponds to the A-CSI request downlink subframe when the report delay is greater than four subframes and a subframe located four subframes prior to the A-CSI report uplink subframe is an uplink subframe or a multicast broadcast single frequency network (MBSFN) subframe.

27. The apparatus of claim 26, wherein the channel and interference are measured based on the type of the A-CSI request downlink subframe that is a fixed subframe.

28. The apparatus of claim 18, wherein the at least one processor is further configured to:
determine, based on the A-CSI report uplink subframe and the report delay, to measure at least one of a second channel or second interference;
determine a location of a second reference subframe based on the A-CSI request downlink subframe; and
measure at least one of the second channel or the second interference based on the second reference subframe.

29. An apparatus for wireless communication in a time division duplex (TDD) long term evolution (LTE) based network, comprising:
means for determining a location of a reference subframe based on an aperiodic channel state information (A-CSI) report uplink subframe, an A-CSI request downlink subframe, a reference delay, and a report delay, wherein the reference delay is a first delay value before the A-CSI report uplink subframe, and wherein the report delay is a second delay value between the A-CSI request downlink subframe and the A-CSI report uplink subframe;
means for determining a type of the reference subframe based on the location of the reference subframe and a subframe configuration, the type of the reference subframe being a flexible subframe or a fixed subframe;
means for measuring at least one of a channel or interference based on the reference subframe and the type of the reference subframe; and means for sending, at the A-CSI report uplink subframe, an A-CSI report based on the at least one of the channel or the interference.

30. A non-transitory computer-readable medium storing computer executable code, comprising code that is executed by a processor for:
   determining a location of a reference subframe based on an aperiodic channel state information (A-CSI) report uplink subframe, an A-CSI request downlink subframe a reference delay, and a report delay, wherein the reference delay is a first delay value before the A-CSI report uplink subframe, and wherein the report delay is a second delay value between the A-CSI request downlink subframe and the A-CSI report uplink subframe;
   determining a type of the reference subframe based on the location of t reference subframe and a subframe configuration, the type of the reference subframe being a flexible subframe or a fixed subframe;
   measuring at least one of a channel or interference based on the reference subframe and the type of the reference subframe; and
   sending, at the A-CSI report uplink subframe, an A-CSI report based on the least one of the channel or the interference.

* * * * *